United States Patent
Krishnaswamy et al.

(10) Patent No.: US 8,207,968 B1
(45) Date of Patent: Jun. 26, 2012

(54) METHOD AND APPARATUS FOR IRRADIANCE CACHING IN COMPUTING INDIRECT LIGHTING IN 3-D COMPUTER GRAPHICS

(75) Inventors: Aravind Krishnaswamy, San Jose, CA (US); Jared M. Johnson, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 850 days.

(21) Appl. No.: 12/324,137

(22) Filed: Nov. 26, 2008

Related U.S. Application Data

(60) Provisional application No. 61/093,201, filed on Aug. 29, 2008.

(51) Int. Cl.
*G06T 15/00* (2011.01)
(52) U.S. Cl. .................. 345/426; 345/419; 345/428
(58) Field of Classification Search .......... 345/419, 345/426, 428
See application file for complete search history.

(56) References Cited

U.S. PATENT DOCUMENTS

| | | | | |
|---|---|---|---|---|
| 6,825,840 | B2 * | 11/2004 | Gritz | 345/426 |
| 7,196,704 | B2 * | 3/2007 | Christensen et al. | 345/428 |
| 7,952,582 | B1 * | 5/2011 | Arvo | 345/426 |

OTHER PUBLICATIONS

Smyk et al, Temporally Coherent Irradiance Caching for High Quality Animation Rendering, EuroGraphics 2005, pp. 401-412.*

Velazquez-Armendariz, E., Lee, E., Bala,K., and Walter, B. 2006. Implementing the render cache and the edge-and-point image on graphics hardware. In GI'06: Proceedings of the 2006 conference on Graphics interface, Canadian Information Processing Society, Toronto, Ont., Canada, Canada, 211-217.

Krivanek, J. and Gautron, P. "Practical Global Illumination With Irradiance Caching", SIGGRAPH 2008 Class, 405 pages.

Don P. Mitchell, "Generating Antialiased Images at Low Sampling Densities," AT&T Bell Laboratories, Computer Graphics, vol. 21, No. 4, ACM, Jul. 1987, 8 pages.

Mahesh Ramasubramanian, et al., "A Perceptually Based Physical Error Metric for Realistic Image Synthesis," Program of Computer Graphics/Cornell University, SIGGRAPH 99, Los Angeles, CA, ACM 1999, pp. 73-82.

Mark R. Bolin, et al., "A Perceptually Based Adaptive Sampling Algorithm," Dept. of Computer and Information Science/University of Oregon, 1998, 11 pages.

Halton, J. H. 1960. On the efficiency of certain quasi-random sequences of points in evaluating multi-dimensional integrals. Numerische Mathematik, 2(1):84-90.

(Continued)

*Primary Examiner* — Phu Nguyen
(74) *Attorney, Agent, or Firm* — Robert C. Kowert; Meyertons, Hood, Kivlin, Kowert & Goetzel, P.C.

(57) ABSTRACT

An irradiance caching method and apparatus that reduces the number of cache points by determining cache points with appropriately anisotropic areas of influence. At each query point when building an irradiance cache, the irradiance gradients of neighborhood cache points may be determined. If the irradiance gradients of neighborhood cache point(s) along a vector in a particular direction are the same as or similar to the irradiance gradient at the query points, the new cache points are spaced farther apart along vectors in that direction. This results in elliptical regions of influence around cache points in regions around the intersections of two surfaces where the irradiance gradient is changing more rapidly along vectors perpendicular to the intersections and less rapidly or not much at all along vectors parallel to the intersections.

31 Claims, 20 Drawing Sheets

OTHER PUBLICATIONS

Jensen, H. W. and Christensen, N. J. 1995. Optimizing path tracing using noise reduction filters. In Proceedings of WSCG 1995, pp. 134-142.

Keller, A. and Heidrich, W. 2001. Interleaved sampling. In Proceedings of the 12th Eurographics Workshop on Rendering Techniques, London, UK. Springer-Verlag, pp. 269-276. ISBN 3-211-83709-4.

Kontkanen, J., Rasanen, J., and Keller, A. 2004. Irradiance filtering for monte carlo ray tracing. In Monte Carlo and Quasi-Monte Carlo Methods 2004, Springer, pp. 259-272.

Kopf, J., Cohen, M., Lischinski, D., and Uyttendaele, M. 2007. Joint bilateral upsampling. ACM Transactions on Graphics (Proceedings of SIGGRAPH 2007), 26(3):96.

Lindemann, S. and Lavalle, S. 2003. Incremental low discrepancy lattice methods for motion planning. In Robotics and Automation, 2003. Proceedings. ICRA '03. IEEE International Conference on, vol. 3, pp. 2920-2927 vol. 3.

McCool, M. D. 1999. Anisotropic diffusion for monte carlo noise reduction. ACM Trans. Graph., 18(2):171-194. ISSN 0730-0301.

Segovia, B., Iehl, J.-C., Mitanchey, R., and P'Eroche, B. 2006. Non-interleaved deferred shading of interleaved sample patterns. In Proceedings of Graphics Hardware, pp. 53-60.

I.M. Sobol, "On quasi-Monte Carlo integrations," Mathematics and Computers in Simulation 47 (1998) pp. 103-112, Institute for Mathematical Modelling of the Russian Academy of Sciences, 4 Miusskaya Square, Moscow 125047, Russia.

Wald, I., Kollig, T., Benthin, C., Keller, A., and Slusallek, P. 2002. Interactive Global Illumination using Fast Ray Tracing. In Proceedings of the 13th EUROGRAPHICS Workshop on Rendering, Saarland University, Kaiserslautern University.

Krivanek, J. and Gautron, P. 2009. "Practical Global Illumination With Irradiance Caching", Morgan & Claypool Publishers, 148 pages.

Bradley, P., Fox, B. L., "Implementing Sobol's quasirandom sequence generator," ACM Transactions on Mathematical Software (TOMS), vol. 14, Issue 1 (Mar. 1988), pp. 88-100, Year of Publication: 1988, ISSN:0098-3500.

Kajiya J. T.: "The Rendering Equation", Proc. SIGGRAPH 86 (Aug. 1986), 143-150.

Krivánek J., Bouatouch K., Pattanaik S. N., Žára J.: "Making Radiance and Irradiance Caching Practical: Adaptive Caching and Neighbor Clamping," In Rendering Techniques 2006, Eurographics Symposium on Rendering (Nicosia, Cyprus, Jun. 2006), Akenine-Möller T., Heidrich W., (Eds.), Eurographics Association, Eurographics Association, pp. XX-XX.

Krivánek J., Gautron P., Bouatouch K., Pattanaik S.: "Improved Radiance Gradient Computation," In SCCG '05: Proceedings of the 21st spring conference on Computer graphics (New York, NY, USA, 2005), ACM Press, pp. 155-159.

Krivánek J., Gautron P., Pattanaik S., Bouatouch K.: "Radiance Caching for Efficient Global Illumination Computation," IEEE Transactions on Visualization and Computer Graphics 11,5 (Sep./Oct. 2005). Also available as Technical Report #1623, IRISA, http://graphics.cs.ucf.edu/RCache/index.php.

Smyk M., Myszkowski K.: "Quality Improvement for Indirect Illumination Interpolation," In ICCVG (2002).

Ward G. J., Heckbert P.: "Irradiance Gradients," In Third Eurographics Workshop on Rendering (Bristol, UK, 1992), pp. 85-98.

Ward G. J., Rubinstein F. M., Clear R. D.: "A Ray Tracing Solution for Diffuse Interreflection," In SIGGRAPH '88: Proceedings of the 15th annual conference on Computer graphics and interactive techniques (New York, NY, USA, 1988), ACM Press, pp. 85-92.

William A. Stokes, James A. Ferwerda, Bruce Walter, Donald P. Greenberg: "Perceptual Illumination Components: A New Approach to Efficient, High Quality Global Illumination Rendering," ACM Transactions on Graphics (TOG), v.23 n.3, Aug. 2004.

* cited by examiner

METHOD AND APPARATUS FOR IRRADIANCE CACHING IN COMPUTING INDIRECT LIGHTING IN 3-D COMPUTER GRAPHICS

PRIORITY INFORMATION

This application claims benefit of priority of U.S. Provisional Application Ser. No. 61/093,201 entitled "Method and Apparatus for Irradiance Caching in Computing Indirect Lighting in 3-D Computer Graphics" filed Aug. 29, 2008, the content of which is incorporated by reference herein in its entirety.

BACKGROUND

Description of the Related Art

Three-dimensional (3-D) computer graphics is concerned with digitally synthesizing and manipulating 3-D visual content. In 3-D computer graphics, global illumination rendering is a method that attempts to capture the way in which light interacts in the real world. Global illumination algorithms generally take into account the light that comes directly from a light source (direct illumination), and also light rays from the same source reflected by other surfaces in the scene (indirect illumination). The results achieved by global illumination rendering processes may produce more photo-realistic synthesized or manipulated images. Conventional global illumination rendering methods are computation-intensive and time-consuming processes, and are thus typically used for off-line rendering rather than in real-time image generation, for example in computer-generated imagery (CGI) applications. Computer-generated imagery (CGI) is the application of the field of computer graphics in various media including, but not limited to: films, television programs, commercials, simulators and simulation generally, and printed media. CGI images are typically produced "off-line"; that is, not in real-time.

Irradiance caching algorithms have been introduced that separate out the low frequency diffuse interreflection component of the rendering equation. Due to its low frequency nature, this component can be sparsely evaluated over the scene at a set of carefully chosen sample points. Interpolation can be performed to reconstruct the signal over the entire scene. This technique has been extended to other low frequency parts of the rendering equation such as glossy reflections.

Caching has been employed to accelerate rendering. For example, a Render Cache has been described that stores computed pixels in screen space and reprojects them as the view changes. Such a cache only maintains visible samples and relies on inter-frame coherence. A more broad-based scheme for storing view independent shading data in caches has also been described.

Irradiance caching techniques may be used in rendering systems for the calculation of indirect lighting. The cache may be used either to accelerate the gather from a pre-computed lighting step (e.g. photon map or a radiosity solution), or as a stand-alone solution, recursively calculating lighting at usually a small, set number of bounces. Irradiance caching may be used in rendering systems with precomputed lighting when direct view of this lighting would show unacceptable artifacts. From the reverse perspective, this pre-computed lighting is often used with irradiance caching because recursive hemisphere sampling is slow and inefficient, requiring many rays to be traced which have little to no visible contribution to the final image.

Ray tracing is a general technique from geometrical optics for modeling the paths taken by light as it interacts with optical surfaces.

An octree is a tree data structure in which each internal node has up to eight children. Octrees may be used, for example, to partition a three dimensional space by recursively subdividing it into eight octants.

SUMMARY

Embodiments of a method and apparatus for irradiance caching that reduces the number of cache points by determining cache points with appropriately anisotropic areas of influence are described. Embodiments may reduce the number of cache points particularly around the joints or intersections of surfaces. By reducing the number of cache points in an irradiance cache, embodiments may increase the speed of both the filling of an irradiance cache over a whole scene, and the subsequent access of the cache. Embodiments may thus provide improved performance for reasonably complex lighting configurations when compared to conventional irradiance caching techniques. Embodiments of this irradiance caching method may be implemented in or with irradiance caching algorithms. Various examples of an irradiance caching algorithm in which embodiments of this irradiance caching method may be implemented are described.

An area where cache points are typically created by conventional irradiance caching techniques at too high of a density is along a straight or slightly curved line where two surfaces or planes meet, which may be referred to as an intersection. Conventional metrics and techniques used for determining how far away objects are on average do not take directional information into consideration. Embodiments of the irradiance caching method take directional information into consideration when determining if a new cache point is to be inserted. With directional information, embodiments may insert fewer cache points near the intersection of surfaces by spacing the cache points farther apart along vectors parallel to the intersection. In the case of two surfaces intersecting, when determining cache points around the intersection, embodiments also calculate the gradient of the lighting change, referred to as the irradiance gradient. The irradiance gradient vector typically points away from, or perpendicular to, the intersection. Along vectors perpendicular to that gradient vector, lighting typically does not change as rapidly. In other words, the lighting typically changes faster along vectors perpendicular to an intersection, and much slower along vectors parallel to the intersection. By taking the gradient of the lighting change into consideration, embodiments may determine in which direction the lighting is changing. Embodiments may use this information to space cache points farther apart along vectors parallel to an intersection and perpendicular to an irradiance gradient vector that is perpendicular to the intersection.

In one embodiment of an irradiance caching method that reduces the number of cache points by determining cache points with appropriately anisotropic areas of influence, at each query point when building an irradiance cache, the irradiance gradients of neighborhood cache points may be determined. If the irradiance gradients of neighborhood cache point(s) along a vector in a particular direction are the same as or similar to the irradiance gradient at the query points, the new cache points are spaced farther apart along the vector in that direction. In one embodiment, this is accomplished by expanding the radius of influence of query points in the particular direction. This results in elliptical regions of influence around cache points in areas around the intersections of two surfaces where the irradiance gradient is changing more rapidly along vectors perpendicular to the intersections and less rapidly or not much at all along vectors parallel to the intersections.

Figure 1:
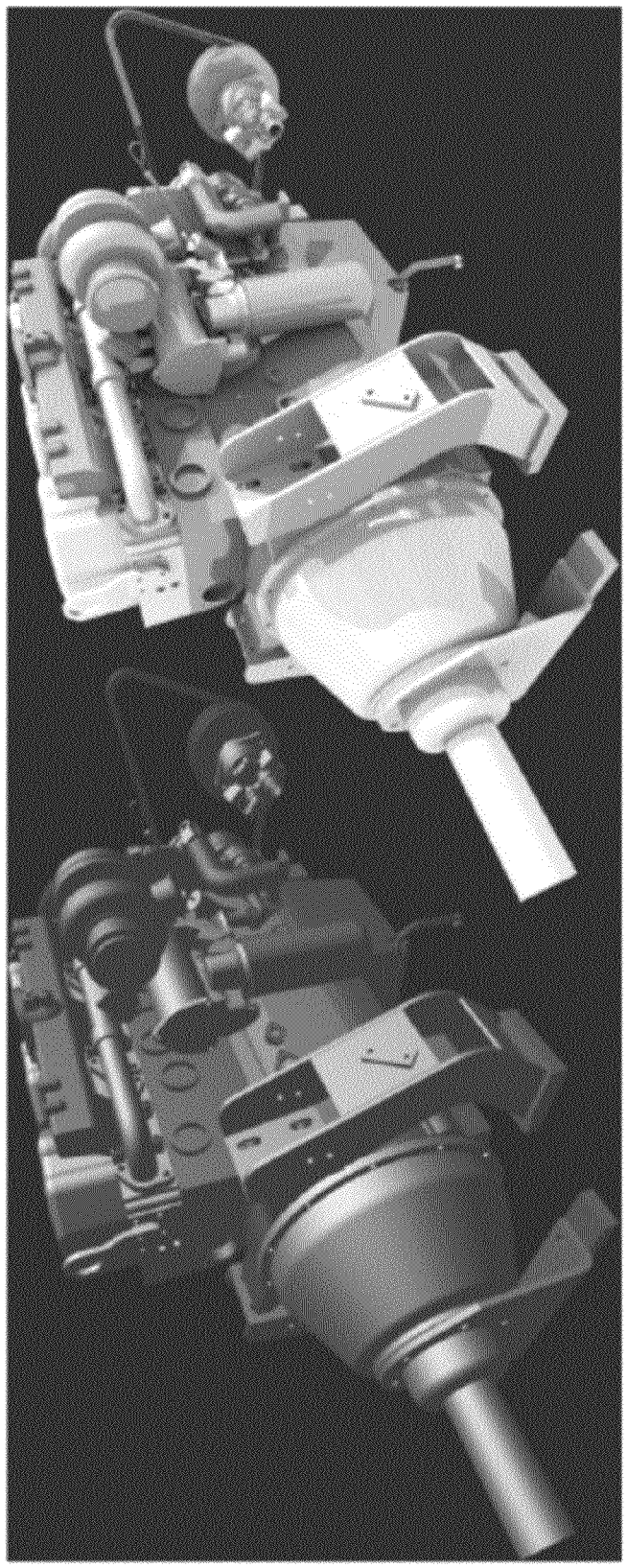
FIG. 1 illustrates ray-traced models without and with global illumination effects.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a method and apparatus for diffuse indirect lighting computation in three-dimensional (3-D) computer graphics are described. Conventional global illumination rendering methods are computation-intensive and time-consuming processes. Two computation-intense and thus time-consuming subprocesses of global illumination rendering are the computation of direct lighting from area light sources and the computation of indirect lighting that reaches a surface via multiple bounces. Embodiments may provide a method for diffuse indirect lighting computation that reduces the expense of this computation or subprocess. In various embodiments, the method for diffuse indirect lighting computation may be implemented alone (e.g., as a module) or in combination with a direct lighting process (e.g., as components of a global illumination rendering module). Embodiments of the method for diffuse indirect lighting computation may reduce the time it takes to perform global illumination rendering of a scene. Examples of types of applications in which embodiments may be implemented may include, but are not limited to, scientific, medical, design (e.g., CAD systems), painting, publishing, digital photography, video editing, games, animation, and/or other applications in which digital image generation, rendering and/or processing may be performed. Specific examples of applications in which embodiments may be implemented include, but are not limited to, Adobe® Photoshop®, Adobe® Illustrator®, and Adobe® After Effects®.

Indirect Lighting Computation—Irradiance Cache Spacing

Embodiments may provide a method and apparatus for diffuse indirect lighting computation. An implementation of the method for diffuse indirect lighting (irradiance) computation may be referred to herein as an indirect lighting module. Examples of types of applications in which embodiments of an indirect lighting module may be implemented may include, but are not limited to, scientific, medical, design (e.g., CAD systems), painting, publishing, digital photography, video editing, games, animation, and/or other applications in which digital image generation and/or processing may be performed. Specific examples of applications in which embodiments may be implemented include, but are not limited to, Adobe® Photoshop®, Adobe® Illustrator®, and Adobe® After Effects®.

Embodiments of the indirect lighting module may implement an irradiance caching algorithm that sparsely computes irradiance in the environment and then interpolates irradiance values between these sparsely computed points or extrapolates an irradiance value if only one irradiance cache point is found in a particular query of the cache. This works because irradiance is typically a very low frequency effect. A key to the algorithm is in choosing the location and spacing of these points. Embodiments may provide a method that guides the sample point placement which incorporates cosine weighting to the selection of the sample points.

FIG. 1 illustrates examples of ray-traced models without and with global illumination effects applied. The image on the left of FIG. 1 was rendered with no global illumination effect. The image on the right of FIG. 1 was rendered using a global illumination effect according to one embodiment. Irradiance caching may be used as an acceleration technique. The result of the global illumination effect using irradiance caching may be approximately the same as ray-tracing-based global illumination; however, performance may be improved using irradiance caching.

The irradiance caching approach used in embodiments of the indirect lighting module differs from previous caching algorithms used in rendering, as the caching approach described herein accelerates the synthesis of a single frame as well as successive frames in much the same manner as the original irradiance cache. Embodiments of the method for diffuse indirect lighting computation may use cosine weighting. Through the application of cosine weighting, if an object detected by a ray is directly overhead, embodiments may assume a significant amount of occlusion or indirect illumination of that surface point, and thus may weight the ray more heavily. If an object is off to the side, and thus at a shallow angle to a normal of the surface point under test, the ray is given less weight. By using cosine weighting, embodiments of the indirect lighting module tend to space out points better around edges and cracks than conventional irradiance caching techniques.

Irradiance is the sum of incoming light (radiance) projected on a surface point. To evaluate this integral in a rendering system, Monte-Carlo integration may be used. The idea is to point sample the integral to achieve an estimate for the sum of incoming light. In practice, this means casting on the order of thousands of rays outward over the hemisphere around each surface point to get a good estimate of the integral. Such computation is very expensive to compute at every visible surface point in a scene.

In many rendering systems, direct irradiance (i.e. light coming from light sources) is handled using a direct monte-carlo technique. Such a technique works well when the light source is small, such as a point light source, since a ray can be cast directly toward the light in evaluating the integral. Indirect irradiance (light that has bounced off of one or more surfaces after leaving the light) in many scenes is typically low frequency, varying smoothly across the scene. Rather than firing thousands of rays around each point to get an estimate of the indirect irradiance, embodiments of the indirect lighting module may use a caching and interpolation/extrapolation scheme.

Conventional irradiance caching techniques typically use minimum distance or average distance value to a nearest hit surface when they evaluate the integral over a hemisphere. However, if a surface is overhead and nearby, it has a greater impact, a larger contribution to the radiance, than a nearby surface that is off at an angle. Therefore, instead of average or minimum distance, embodiments use a cosine weighted distance. In embodiments, indirect irradiance may be computed at a set of sparse locations in the scene, and interpolation and/or extrapolation may be used to reconstruct indirect irradiance between these points. Equation (1) is the form factor:

$$F_{i \to j} = \frac{\cos(\theta_i)\cos(\theta_j)}{\pi r^2} \quad (1)$$

One embodiment may calculate the form factor (1) for each sample when calculating the irradiance value of a new cache point. With the irradiance value and irradiance gradients, one embodiment may also store the maximum form factor calculated during hemisphere sampling. This maximum form factor gives a good approximation of how much a given point's lighting is influenced by nearby geometry. This value may be used, for example, to control the spacing of sample points.

Equation (2), given below, shows that the calculation consists of a multiply of this maximum form factor by the squared distance between the stored point and query point summed with one minus the cosine of the angle between the normals of these points. If the error specified by this calculation ($\epsilon_{p_i}$) is below a pre-defined constant $\alpha$, there is a cache hit.

$$\epsilon_{p_i} = ((\vec{p} - \vec{p}_i) \cdot (\vec{p} - \vec{p}_i) F_{P_{max}} + (1 - \hat{n} \cdot \hat{n}_p)) \quad (2)$$

The dot products in equation (2) provide cosine weighting because the dot product between normals gives a cosine weighting. Thus, embodiments scale the confidence factors by the cosine-weighted term. The value (s) is more sensitive to small, nearby surfaces that have a predominant influence on the lighting at a given point than conventional irradiance caching techniques. However, unlike the minimum distance or the average distance used in conventional irradiance caching techniques, this value does not oversample on concave surfaces, and provides improved sample spacing at corners, edges and cracks.

In addition to these benefits, this metric may also speed up the irradiance cache query. The form factor scales directly with the distance squared, which means that when searching for points in an irradiance cache, the squared distance in the error calculation may be used to eliminate many expensive square root calculations for each query.

Figure 2A:
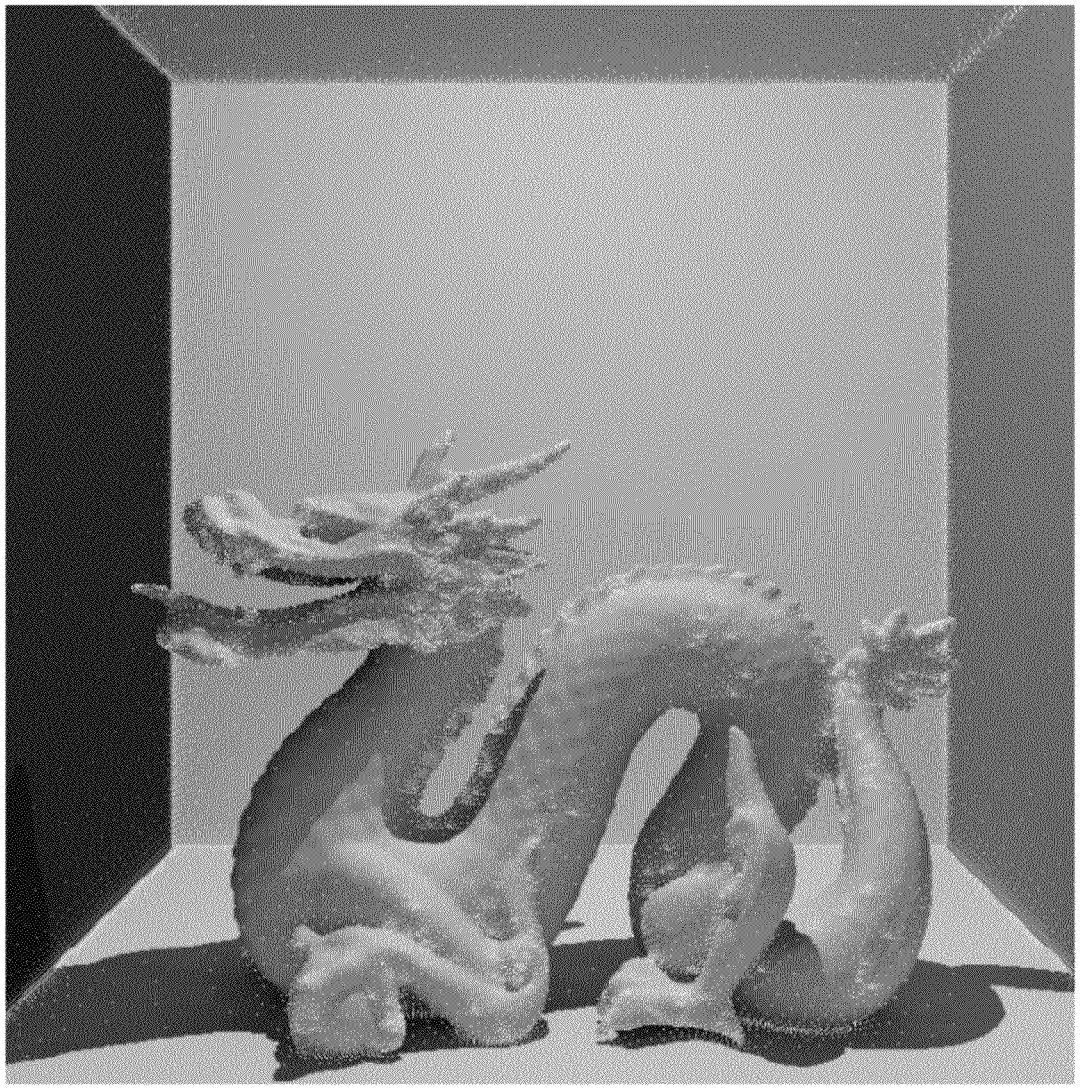
FIGS. 2A through 2C illustrate irradiance cache spacing and irradiance points in an example rendered image according to one embodiment.
Figure 2B:
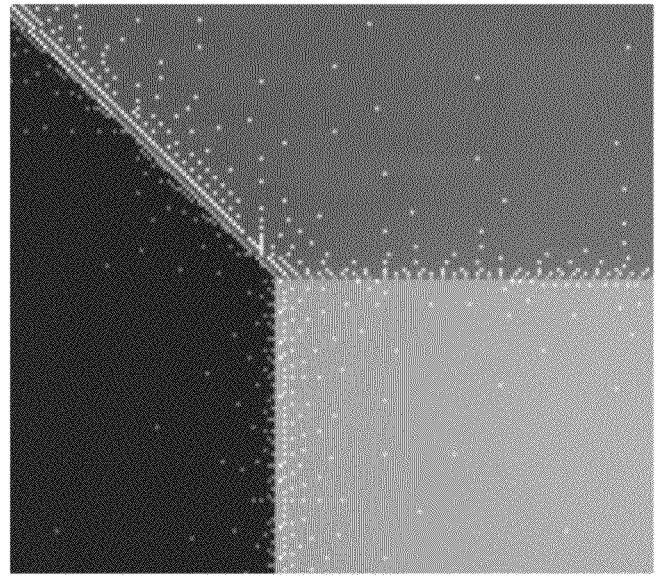
Figure 2C:

FIGS. 2A through 2C illustrate irradiance caching and irradiance points in an example rendered image according to one embodiment. FIG. 2A illustrates a rendered image of a dragon in a room after a first pass. The image shows sample locations (sample points). FIG. 2B is a close-up of the upper left corner of the image in FIG. 2A, showing the sample locations in more detail. FIG. 2C is a close-up of the head of the dragon, also showing the sample locations in more detail. (Source data for the model from which the dragon was rendered was provided by The Stanford University Computer Graphics Laboratory from a publicly available dataset.)

Figure 3:
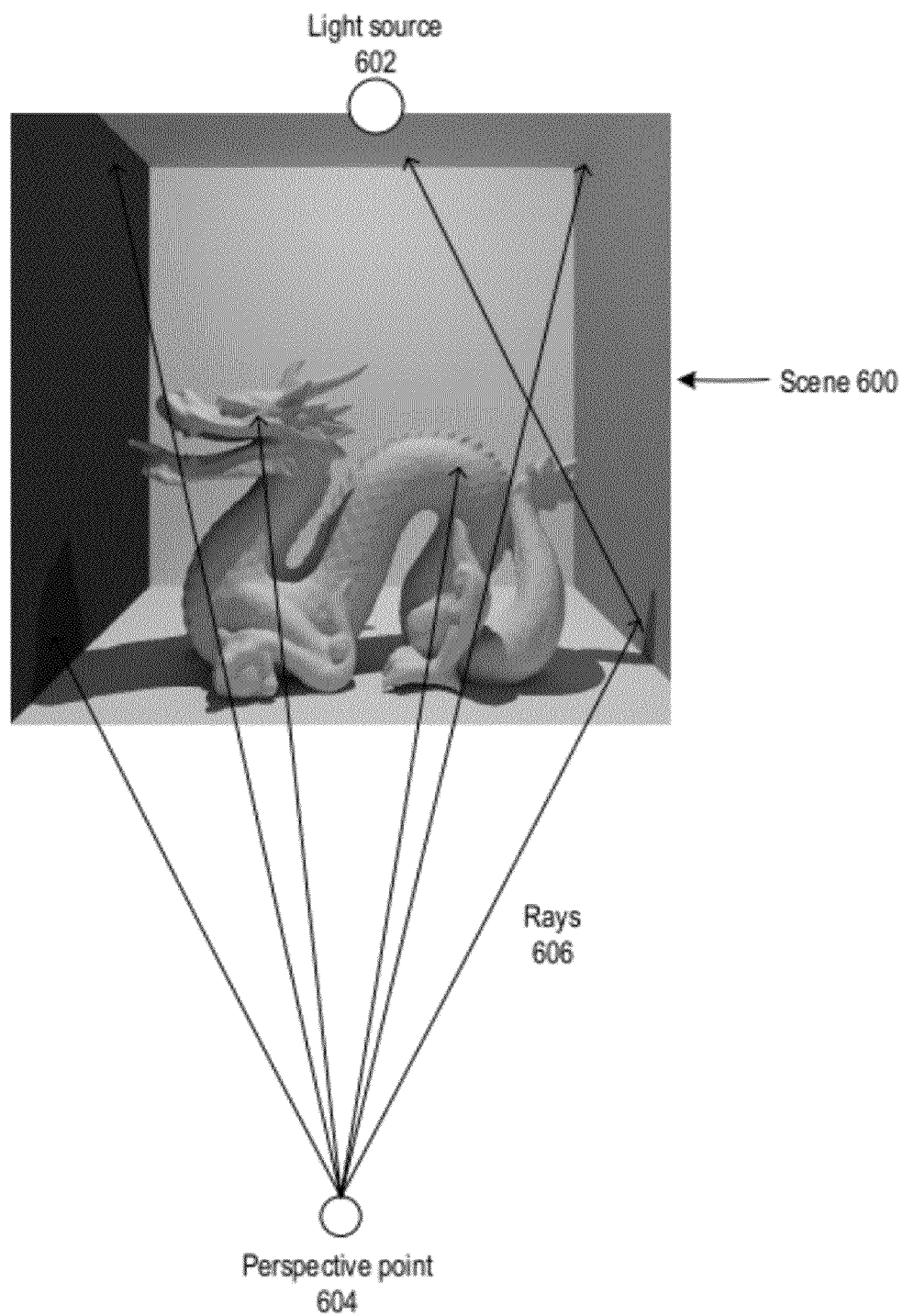
FIG. 3 illustrates the firing of rays at the example rendered image according to one embodiment.

To perform irradiance caching, in one embodiment, rays may be fired, for example starting at the bottom of the scene. FIG. 3 illustrates the firing of rays at an example rendered image according to one embodiment. The rays 606 may be fired from the perspective point 604 of a "viewer" of the scene 600. Light source 602 shows the approximate location of the light source in scene 600. In one embodiment, for each pixel in the scene 600, a ray 606 is fired into the pixel. Note that, since indirect irradiance is being determined, a ray 606 may "bounce" off the point and hit another point in the scene, and so on, until, for example, the ray does not hit a point in the scene, or until some other specified limit is reached. Each time a ray 606 hits a point on a surface in the scene 600, an irradiance data structure, also referred to as an irradiance cache, that caches or stores determined irradiance values for surface points in the scene, may be checked to see if there are nearby irradiance points on the surface. A cosine weighted method as described in relation to equations (1) and (2) may be applied in determining if a point with an irradiance value in the data structure is to be accepted as a nearby irradiance point. If there are enough nearby irradiance points in space whose confidence bounds overlap the point (e.g., at least N nearby irradiance points, where N specifies a minimum threshold for irradiance points needed to perform interpolation), then interpolation using irradiance values from the determined nearby irradiance points may be performed to determine the irradiance value for the point. If there are no or not enough nearby irradiance points, a new irradiance value for that point on the surface is calculated and added to the irradiance cache.

Figure 4:
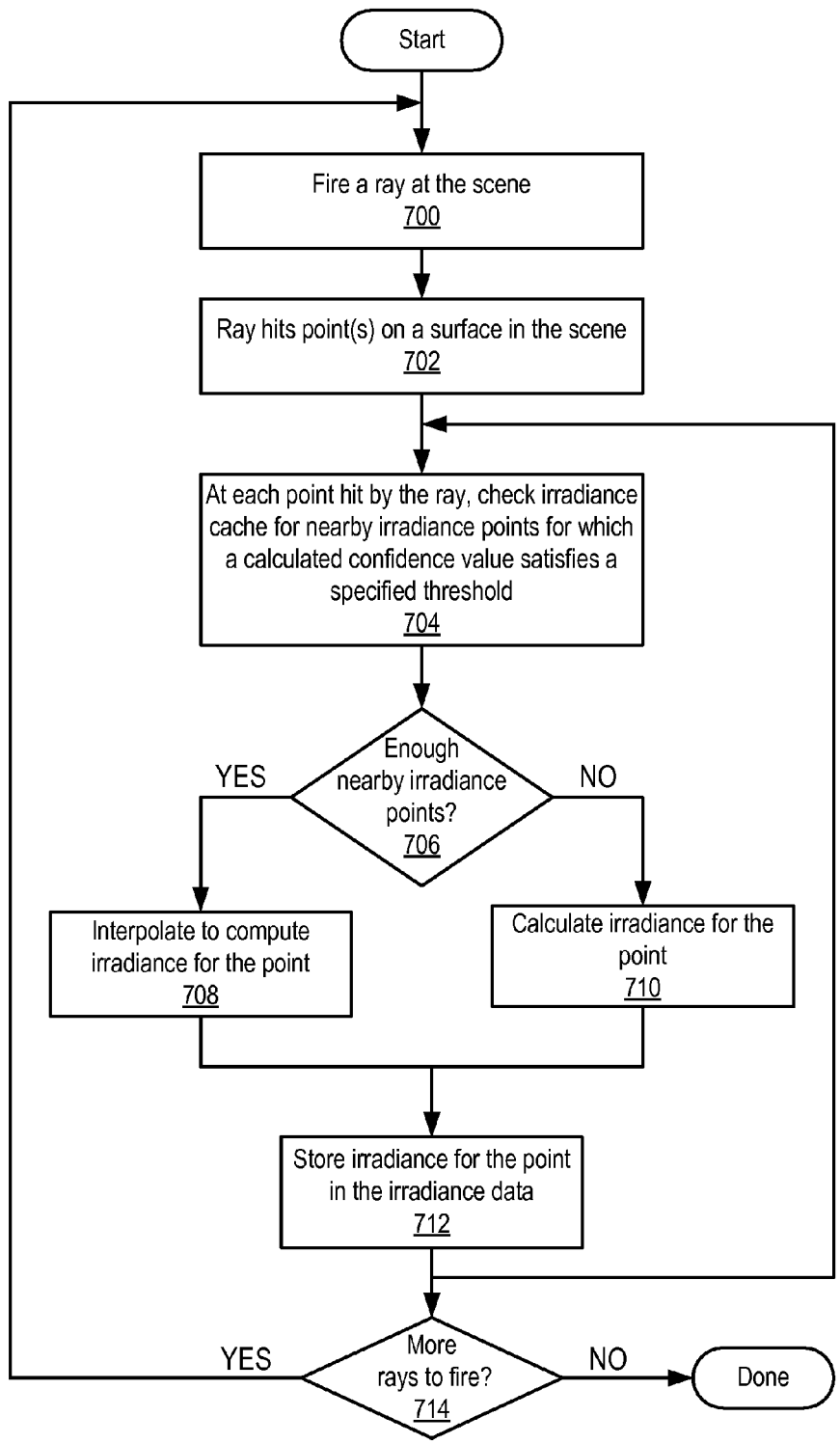
FIG. 4 is a flowchart of a method for diffuse indirect lighting computation in a scene according to one embodiment.

FIG. 4 is a flowchart of a method for diffuse indirect lighting computation in a scene according to one embodiment. This method illustrates a single pass over a scene, e.g. scene 600 of FIG. 3. As indicated at 700, a ray is fired at the scene from a "viewer" perspective. As indicated at 702, the ray hits a point on a surface in the scene. Note that, since irradiance is being determined, the ray may "bounce" off the point and hit another point in the scene, and so on, until the ray does not hit a point in the scene. In some embodiments, the number of "bounces" for a ray may be limited to a set number, or may be limited using a "Russian roulette" technique. Elements 704 through 712 may thus be performed for each point in the scene hit by the ray. As indicated at 704, a check is made to determine if there is irradiance data for nearby irradiance points to the point being evaluated in the irradiance cache. If there are nearby irradiance points, a confidence value is calculated for each such point. A cosine-weighted method may be used, for example a method that implements equations (1) and (2). If the confidence value calculated for a point for which there is irradiance data in the irradiance cache satisfies a specified threshold, e.g. as described in relation to equations (1) and (2), then the point is considered a cached nearby irradiance point. As indicated at 706, if enough such nearby irradiance points are found, for example if the quantity of such points is above a specified minimum, then interpolation of the stored irradiance values for at least a portion of the set of located nearby irradiance points may be used to determine the irradiance for the point under evaluation, as indicated at 708. If there are insufficient nearby points in the irradiance cache, then the irradiance may be calculated for the point, e.g., using a conventional method as indicated at 710. As indicated at 712, the irradiance data for the point may be stored in the irradiance cache. The irradiance data for the point may thus be used in determining irradiance for other nearby points in the scene. If there are more points hit by the ray, the method returns to 704. Otherwise, as indicated at 714, if there are more rays to fire at the scene on this pass, then the method returns to 700. At 714, if there are no more rays to be fired, the irradiance caching pass is done.

Figure 5:
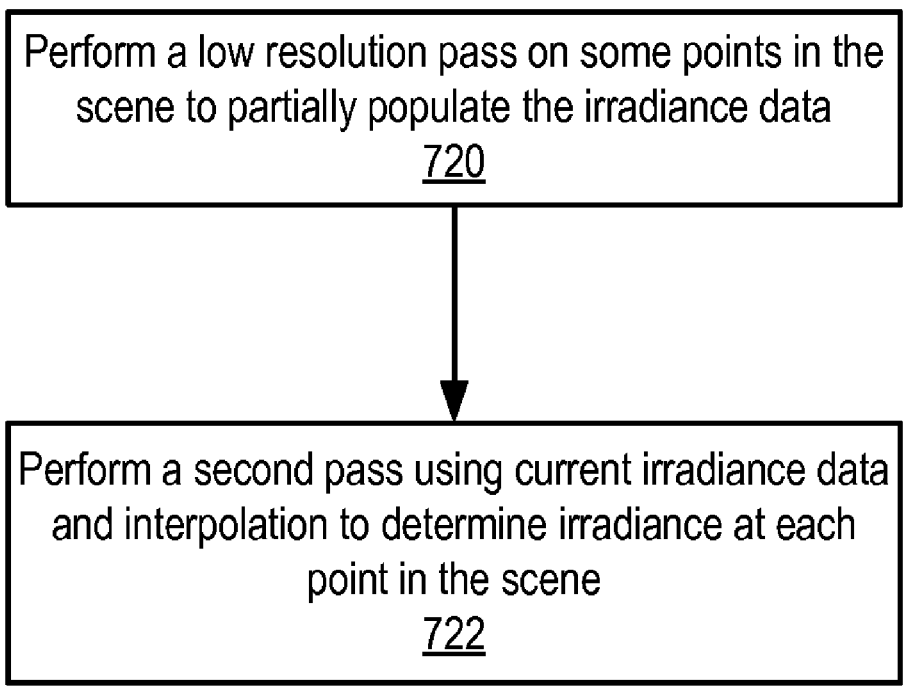
FIG. 5 is a flowchart of a two-pass method for determining irradiance in a scene according to one embodiment.

Irradiance caching may be performed either prior to or during the rendering of a scene. However, when performed while rendering a scene, irradiance caching may create artifacts. Therefore, while in one embodiment irradiance caching may be performed in one pass, in another embodiment, irradiance caching may be performed in multiple, e.g. two, passes. FIG. 5 is a flowchart of a two-pass method for determining irradiance in a scene according to one embodiment. As indicated at 720, a low resolution pass may first be performed on some points in the scene to partially populate the irradiance data. The first pass renders the scene and generates irradiance values at a low resolution. As indicated at 720, a second pass may be performed in which the current irradiance data and an interpolation technique are used to determine irradiance at each point in the scene. The second pass may be performed to render the scene again at higher resolution; on the second pass, the previously filled in irradiance values may be used in determining and interpolating irradiance at points in the scene. In one embodiment, on the second pass, around each point, a blend kernel may be used, for example a disc or circle blend kernel may be used around each point to blend the values and thus to clean up possible artifacts.

Figure 6:
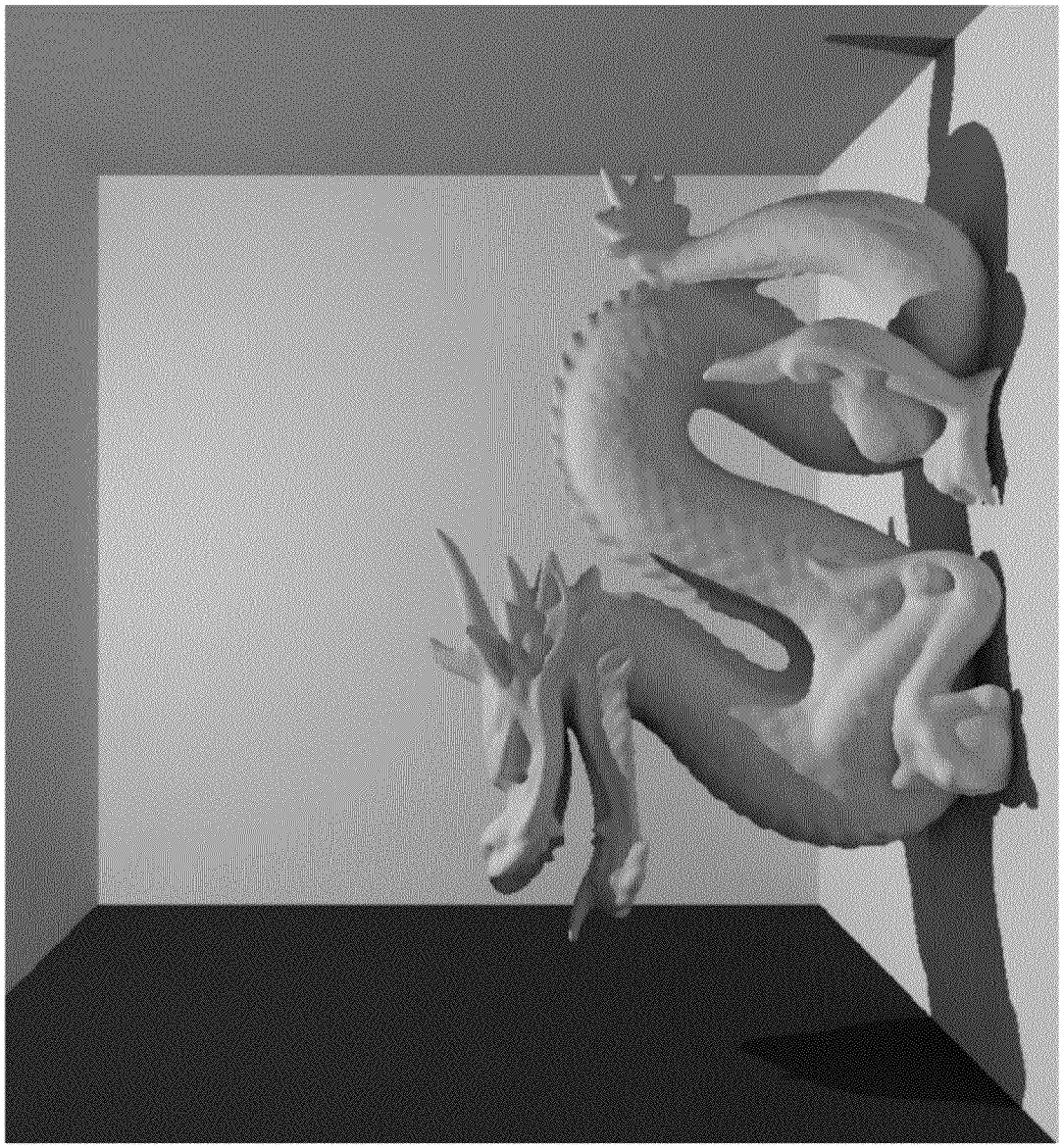
FIG. 6 illustrates the example rendered image of FIG. 2A after a second pass to clean up artifacts left by a first, lower resolution, pass.

Thus, in one embodiment, an initial pass may be made through the image at a lower resolution that fills in some or most of the irradiance cache points. A second pass is then performed, and since some irradiance cache points are already there, interpolation is used to clean up the scene. This may reduce artifacts that may be generated using only a single pass, producing smoother gradients of shading and color. FIG. 6 illustrates the example rendered image of FIG. 2A after a second pass to clean up artifacts left by a first, lower resolution, pass.

In some embodiments a validation pass may be second, where rays are fired towards a light source in regions where the irradiance cache indicates all or no occlusion. Such rays may have random locations or on a regular grid. Rays from such validation points may be used to mark nearby cache points as partially occluded. A third pass then renders the final image.

Irradiance Caching Method for Reducing the Number of Cache Points

Embodiments of an irradiance caching method that reduces the number of cache points by determining cache points with appropriately anisotropic areas of influence are described. Embodiments may reduce the number of cache points particularly around the joints or intersections of surfaces. By reducing the number of cache points in an irradiance cache, embodiments may increase the speed of both the filling of an irradiance cache over a whole scene, and the subsequent access of the cache. Embodiments may thus provide improved performance for reasonably complex lighting configurations when compared to conventional irradiance caching techniques. Embodiments of this irradiance caching method may be implemented in or with irradiance caching algorithms. An example of an irradiance caching algorithm in which embodiments may be implemented is the above-described irradiance caching algorithm that sparsely computes irradiance in the environment and then interpolates irradiance values between these sparsely computed points or extrapolates an irradiance value if only one irradiance cache point is found in a particular query of the cache. Embodiments of the irradiance caching method that reduces the number of cache points by determining cache points with appropriately anisotropic areas of influence may be implemented in an indirect lighting module Factors that control the speed at which an irradiance cache can be filled for a given scene may include the number of hemisphere samples cast at each point and the number of cache points created. By reducing the number of hemisphere samples at each cache point, the likelihood that a monte carlo estimate is visually different than the actual irradiance value may be increased. Storing a poor estimate in the irradiance cache is an even a bigger problem than having poor estimates per-pixel. Per-pixel noise is more visually acceptable than a bad cache point estimate being extrapolated over a large area. In addition, a poor estimate is even more problematic in an animation, since noise in the estimate over time results in unnatural sudden changes in color over a larger area. This means that calculating a precise estimate for indirect lighting is even more important in irradiance caching; consequently, even more hemisphere samples may be needed per irradiance cache point than would be needed in doing the calculation per-pixel. This problem precludes speeding up the filling of the cache through fewer hemisphere samples, when any improvement in hemisphere integration would not show a relative improvement over the brute-force case. For this reason, embodiments are directed at using fewer cache points to represent the irradiance function across an image.

Creating fewer cache points speeds up the search for nearby cache points during shading. A smaller cache means fewer points to search through; however, since the search time is logarithmically proportional to the number of cache points, even a halving of the cache size would not have much of an effect. Speed of cache access may also be increased by optimizing the error calculations performed for each cache point found, and by reducing even further the number of cache points for which this calculation has to be performed. The first goal may, for example, be accomplished by simplifying the error metric used and eliminating expensive calculations, and the latter goal may be accomplished by tightening the bounding box of cache points to an area which more closely fits the area for which a point will be valid. This allows embodiments to add pointers to a cache point to fewer nodes in the cache.

Implementations of an irradiance caching technique may allow for the rendering of images with smooth indirect illumination much faster than brute-force rendering. The images generated may typically be very close to the ground truth. The cost of expensive hemisphere integration is amortized over many tens, sometimes hundreds, of pixels. However, the interpolation and extrapolation of cache points beyond the pixel they are computed at introduces bias into the rendering. Even with an unlimited number of hemisphere samples, the expected value of the final image is not necessarily the correct solution to the rendering equation.

The bias introduced may be entirely due to interpolation and extrapolation not necessarily representing the actual irradiance function across surfaces. This means that if the area that cache point values are extrapolated to is reduced, the number of pixels whose expected value equals the ground truth may be increased. If the influence of cache points beyond a single pixel is reduced, the result is an unbiased solution. A problem is that any speed-up from using the irradiance cache may be lost, and a computational cost may actually be incurred from storing each record without reuse.

It can be implied that if an irradiance cache is being used, rendering efficiency has been chosen over accuracy. Generally, the goal is not to render an unbiased solution, just one without any unacceptably conspicuous artifacts and that looks visually plausible. In some complex areas of a scene, these artifacts can only be resolved with almost pixel-level spacing of cache points. Other areas can have a single cache point smoothly represent the indirect illumination over hundreds of pixels. The goal of efficient cache point placement is to use the smallest density possible over any and all parts of an image. For the most part, current cache point spacing techniques do a fairly good job of this. However, there is room for improvement.

An area where cache points are typically created by conventional irradiance caching techniques at too high of a density is along a straight or slightly curved line where two surfaces or planes meet, which may be referred to as an intersection. In an irradiance caching technique, an estimate, referred to as a harmonic mean, captures how close nearby objects are to a query point. The harmonic mean gets smaller when approaching a surface such as a wall; the irradiance technique assumes there are new objects nearby, and thus many cache points get inserted. See, for example, FIG. 2B, for an example of this phenomenon. Even though two query points may be near each other and have similar lighting, if they both have a low harmonic mean a conventional technique may insert cache points at both points. The conventional metric and technique used for determining how far away objects are on average does not take directional information into consideration.

Embodiments of the irradiance caching method take directional information into consideration when determining if a new cache point is to be inserted. With directional information, embodiments may insert fewer cache points near the intersection of surfaces by spacing the cache points farther apart along vectors parallel to the intersection. In the case of two surfaces intersecting, when determining cache points around the intersection, embodiments also calculate the gradient of the lighting change, referred to as the irradiance gradient. The irradiance gradient vector, along which lighting tends to change rapidly, typically points away from, or perpendicular to, the intersection. Along vectors perpendicular to that gradient vector, lighting typically does not change as rapidly. In other words, the lighting typically changes faster along vectors perpendicular to an intersection, and slower along vectors parallel to the intersection. By taking the irradiance gradient into consideration, embodiments may determine in which direction the lighting is changing most rapidly. Embodiments may thus space cache points farther apart along vectors parallel to an intersection and perpendicular to an irradiance gradient vector that is perpendicular to the intersection and along which lighting changes most rapidly.

In an irradiance caching technique, neighbor clamping is a term used for a process of looking at nearby records (cache points) that have already been added to the cache, and is typically performed at a query point when it is known that a query point is to be added to the cache and hemisphere integration at that point has been performed. In one embodiment, when neighbor clamping is being performed, the method determines the irradiance gradient at the query point. The method then examines nearby cache points to compare the determined irradiance gradient of the query point to the irradiance gradient at nearby cache points. If the irradiance gradients at the nearby points are the same or similar to the irradiance gradient at the query point, the method may space the cache points farther apart perpendicular to the irradiance gradient vector (the direction in which lighting is changing most rapidly), resulting in a more elliptical region of influence around a cache point.

In one embodiment, the method does not place a new cache point at a query point if the testing of the irradiance gradient determines that there are neighborhood cache points with the same or substantially similar irradiance gradient. If the irradiance gradients are different, the method defaults to more circular cache point regions of influence. In other words, if nearby cache points have similar irradiance gradients, the method considers the level of anisotropy higher, and thus can assume an elliptical, less circular, region of influence around a cache point because it can be determined from the irradiance gradients that the lighting is only changing significantly in one direction (along the irradiance gradient vector) in that neighborhood. This results in cache points being spaced closer together in the direction of the irradiance gradient vector, but farther apart on vectors perpendicular to the irradiance gradient vector and parallel to a nearby intersection.

In one embodiment, the method simply does not place a new cache point at a query point if the testing of the irradiance gradient determines that there are neighborhood cache points with the same or substantially similar irradiance gradient. However, when the query point is being examined, the gradient/hemisphere sampling has already been computed for the point, so not adding the point to the cache would be wasteful. Therefore, in another embodiment, the radius that defines the region of influence for the query point is made larger in the direction of neighborhood cache points with the same or substantially similar gradient so that new cache points do not get added into those areas, but the query point under test is added as a cache point. This embodiment is consistent with a "lazy" approach of irradiance caching.

Figure 7A:
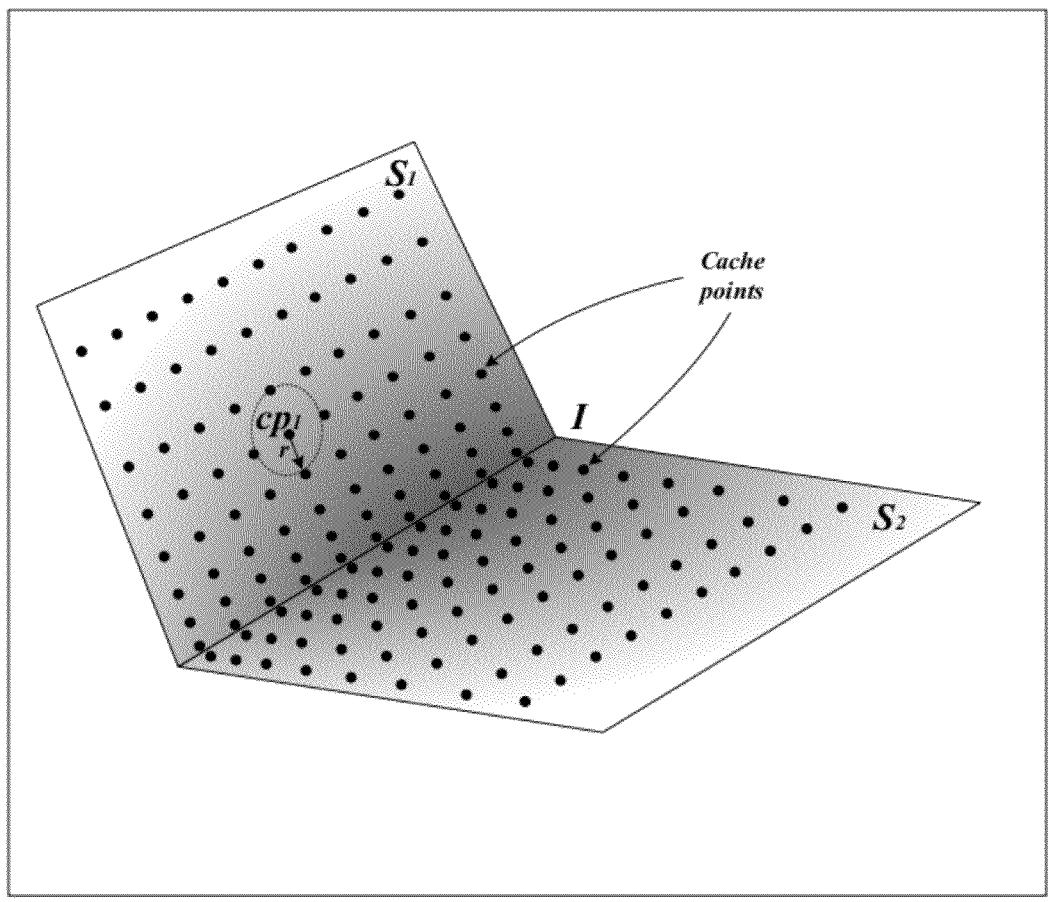
FIG. 7A illustrates two surfaces $S_1$ and $S_2$ that intersect at I, and a typical distribution of cache points around I as may be distributed by a conventional irradiance caching technique.
Figure 7B:
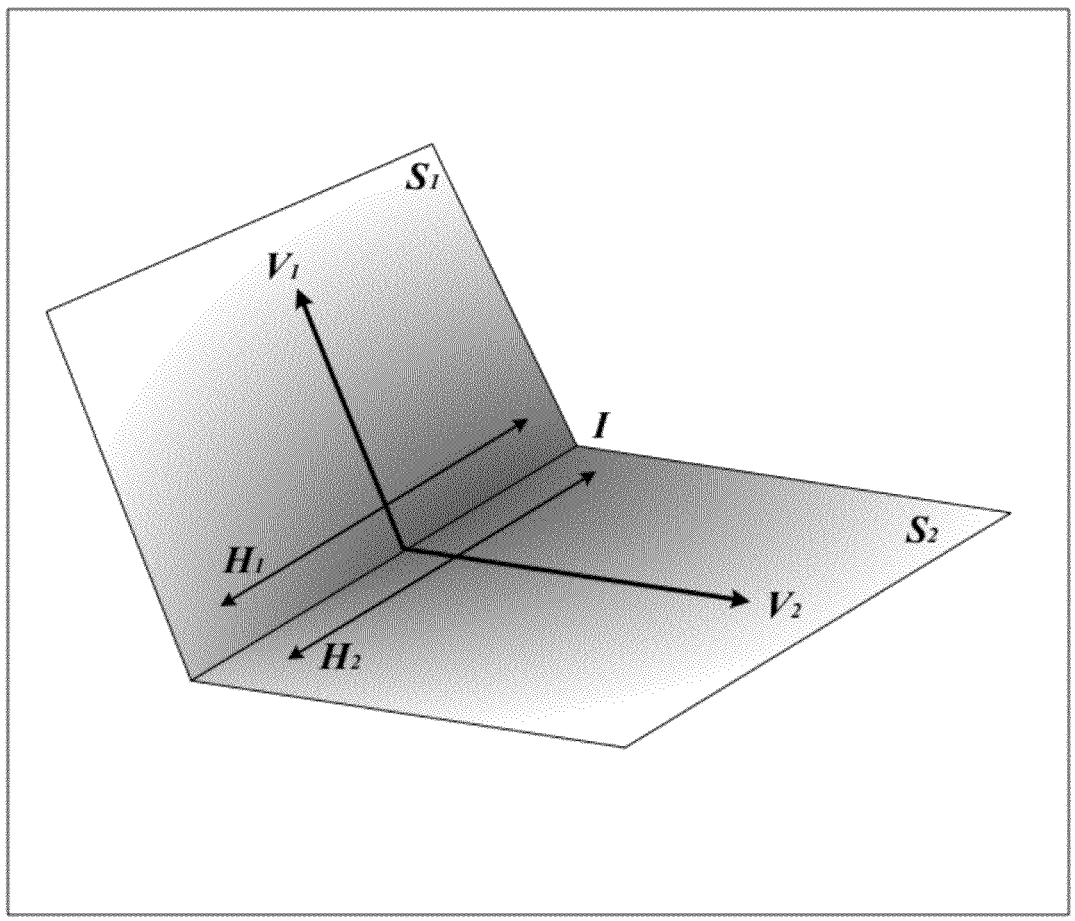
FIG. 7B shows the two surfaces $S_1$ and $S_2$ with $V_1$ and $V_2$ representing vectors perpendicular to the intersection I on surfaces $S_1$ and $S_2$, respectively, and $H_1$ and $H_2$ representing vectors parallel to I on surfaces $S_1$ and $S_2$, respectively.

FIG. 7A illustrates two surfaces $S_1$ and $S_2$ that intersect at I, and a typical distribution of cache points around I as may be distributed by a conventional irradiance caching technique. FIG. 7B shows the two surfaces $S_1$ and $S_2$ with $V_1$ and $V_2$ representing vectors perpendicular to the intersection I on surfaces $S_1$ and $S_2$, respectively, and $H_1$ and $H_2$ representing vectors parallel to I on surfaces $S_1$ and $S_2$, respectively. The irradiance gradients and indirect illumination on a surface (e.g., $S_1$ and $S_2$) are often constant or slowly changing on the surfaces in directions parallel to the intersection, such as I. Thus, cache points could be spaced farther apart in this direction. However, the irradiance gradient often changes more rapidly when moving away from, or perpendicular to, the intersection, requiring closer spacing of cache points to properly represent the rapidly changing function. Using a constant radius of influence around a cache point, as is done in conventional irradiance caching techniques, precludes accounting for this anisotropy in function change. See, for example, FIG. 7A, where cache point $cp_1$ has a constant radius of influence r, which results in close spacing of cache points in directions both parallel and perpendicular to intersection I on surface $S_1$. In other words, conventional methods tend to assume isotropic conditions around cache points near intersections, while in may cases the conditions are actually anisotropic.

Instead of using a constant radius of influence r and thus cache points with isotropic areas of influence, embodiments of an irradiance caching method as described herein may determine cache points with appropriately anisotropic areas of influence:

$$\hat{T} = \frac{\nabla E}{\|\nabla E\|} \quad (1)$$

$$\hat{B} = \hat{T} \times \hat{N} \quad (2)$$

where E is the irradiance, $\hat{T}$ is the normalized translational irradiance gradient vector, and $\hat{N}$ is the unit surface normal. $\hat{B}$ is thus a unit vector perpendicular to both $\hat{T}$ and $\hat{N}$.

Finding areas where this caching optimization can be employed is relatively straightforward. In one embodiment, during neighbor clamping, the gradients of nearby points that will be interpolated with the point being added to the cache are checked. If all the nearby points have a translational gradient in the same direction as the point being added to the cache, it is known that the function does not change very much in the direction perpendicular to the gradient along the surface being shaded. The minimum cosine between the new cache point gradient and all nearby gradients is found. The minimum cosine is multiplied by a constant integer γ, where γ is greater than 1, and 1 is then added. The value γ (gamma) represents the degree of anisotropy of the cache point. Effectively, the area of influence perpendicular to the gradient is extended by this multiple of the radius $R_i$, which is calculated the same as for a regular cache point. The method then stores the gradient vector $\hat{T}$ scaled by the inverse square of this radius $R_i$, and the vector perpendicular to the gradient and the surface normal (i.e., the vector $\hat{B}$ in equation (2)) scaled by the inverse square of $(\gamma+1)R_i$:

$$\vec{V} = P - P_i \quad (3)$$

$$\frac{(\vec{V} \cdot \hat{T})^2}{R_i^2} + \frac{(\vec{V} \cdot \hat{B})^2}{((\gamma+1)R_i)^2} < 1 \quad (4)$$

Calculating the error for interpolation from these cache points amounts to projecting the vector $\vec{V}$ between the query point P and the cache point $P_i$ into the two-dimensional coordinate frame created by the gradient vector $\hat{T}$ and the surface normal $\hat{B}$. This parameterization can be seen as a virtual elliptical cylinder centered on the cache point being testing against (see, for example, cache point $cp_1$ in FIG. 7C). The transform into this space, and the test for inside/outside is demonstrated in equation (4).

Note γ (gamma) in the denominator of equation 4, which represents the level of anisotropy. The value of γ may change based on the gradients of cache points in the neighborhood of the query point. For every cache point that would be interpolated with this query point, the method examines the gradient for that point to determine the value. If the neighboring cache points have gradients in the same direction as the query point, γ will be set to a higher value. If not, γ will be set to a lower value or 0. If γ is high, the region of influence will be more elliptical. As γ approaches 0, the region of influence will be closer to circular. The value of γ may thus be variable relative to the change in gradient in a particular direction (parallel to an intersection), and the region of influence around cache points in that direction may be more or less elliptical relative to the value of γ.

The spatial division that is created is unbounded in the direction of the surface normal $\hat{B}$. To bound the space in this direction, shadow testing as described previously herein may be used to ensure that a cache hit is on the same surface as the query point. Shadow testing is used when interpolating the value for a point to insure that cache points being used in the interpolation are more or less coplanar with the point being shaded. When projecting a vector or shadow ray between a cache point and a point being shaded into the space of the ellipse (the region of influence), only two coordinates are used, and thus it is essentially a 2D projection. Shadow testing insures that the cache points from which shading is calculated are close to coplanar with the point being shaded. Otherwise, the method may allow all the cache points in an elliptical cylinder around a point to be interpolated into it when shading for the point is being computed.

Figure 7C:
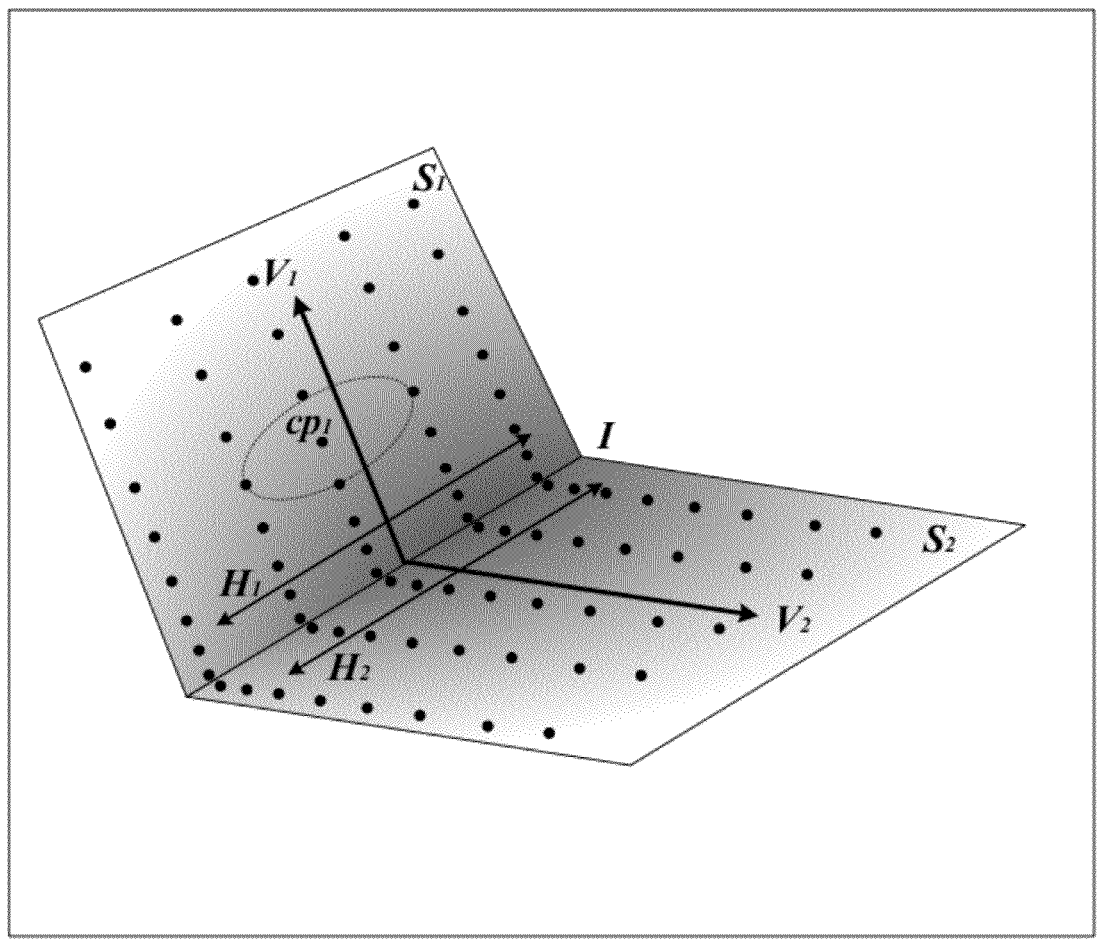
FIG. 7C illustrates cache point spacing along the intersection of the two surfaces S1 and S2 according to one embodiment of an irradiance caching method that reduces the number of cache points by determining cache points with appropriately anisotropic areas of influence.

FIG. 7C illustrates cache point spacing along the intersection of the two surfaces S1 and S2 according to one embodiment of the irradiance caching method described above. Note that the cache points tend to be spaced farther apart in directions parallel to intersection I when compared to FIG. 7A. The area of influence around cache point $cp_1$ is now elliptical, stretched out along an axis substantially parallel to intersection I, rather than circular, as it was in FIG. 7A. The spacing of pixels in the direction perpendicular to I remains about the same. Overall, there are fewer cache points around intersection I in FIG. 7C than in FIG. 7A.

Figure 8A:
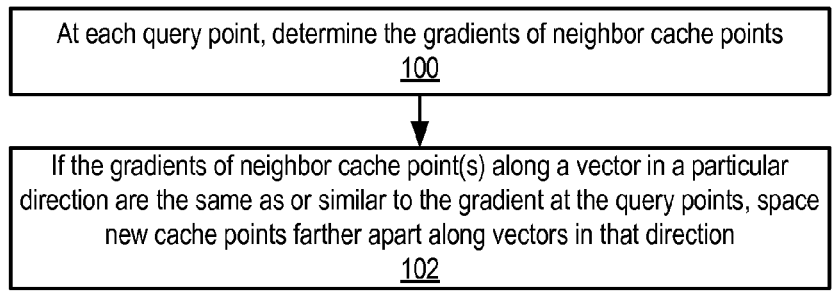
FIG. 8A is a high-level flowchart of an irradiance caching method that reduces the number of cache points by determining cache points with appropriately anisotropic areas of influence according to one embodiment.

FIG. 8A is a high-level flowchart of an irradiance caching method that reduces the number of cache points by determining cache points with appropriately anisotropic areas of influence according to one embodiment. As indicated at 100, at each query point when building an irradiance cache, the gradients of neighborhood cache points may be determined. As indicated at 102, if the gradients of neighborhood cache point(s) along a vector in a particular direction are the same as or similar to the gradient at the query points, the new cache points are spaced farther apart along the vector in that direction, as described above. This results in elliptical regions of influence around cache points in regions around the intersections of two surfaces where the irradiance gradient is changing more rapidly along vectors perpendicular to the intersections and less rapidly or not much at all along vectors parallel to the intersections.

Figure 8B:
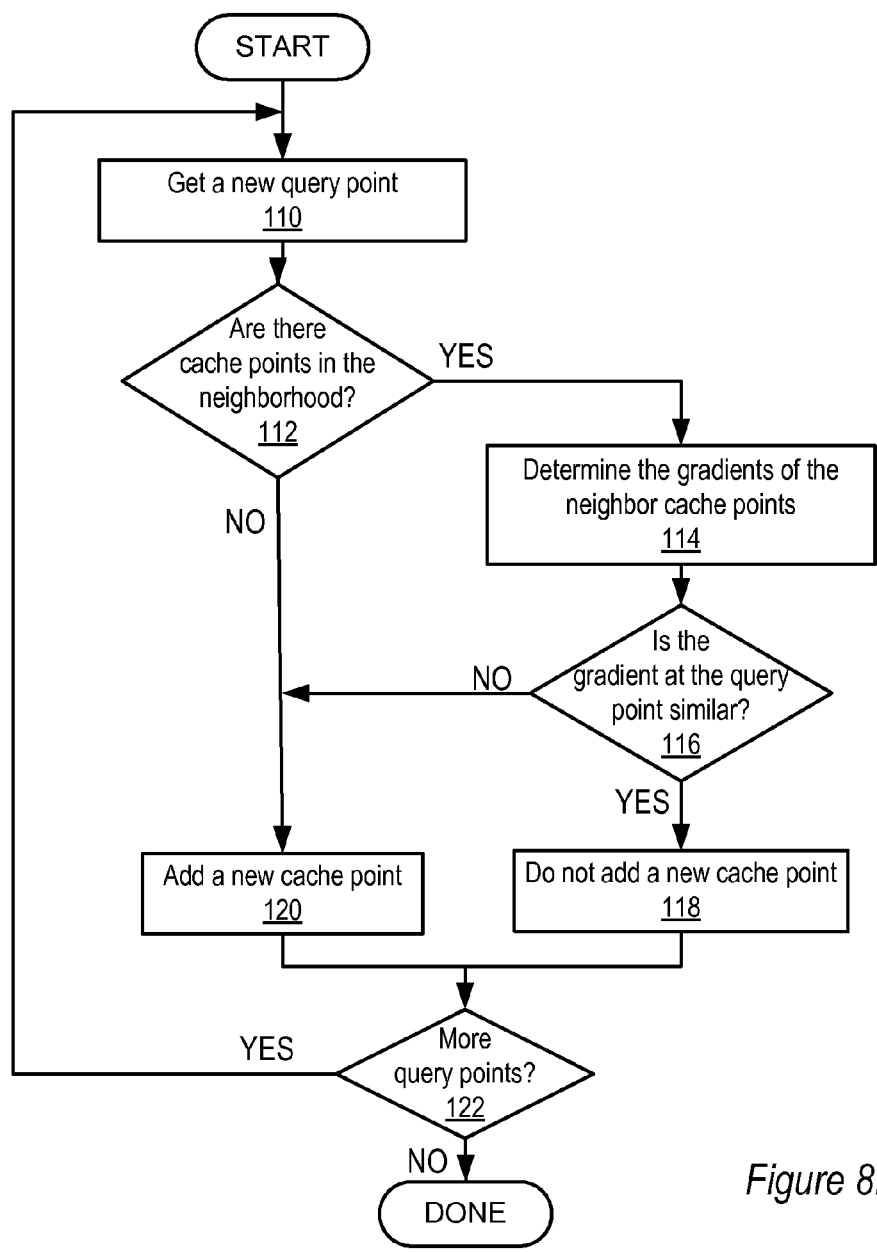
FIG. 8B is a more detailed flowchart of an irradiance caching method that reduces the number of cache points according to one embodiment.

FIG. 8B is a more detailed flowchart of an irradiance caching method that reduces the number of cache points by determining cache points with appropriately anisotropic areas of influence according to one embodiment. When building an irradiance cache, a new query point may be obtained, as indicated at 110. The irradiance gradient at the query point may be determined. A test may be performed to determine if there are cache points already in the cache that are within a specified neighborhood of the query point. At 112, if there are no cache points in the neighborhood, then a new cache point corresponding to this query point may be added to the irradiance cache, as indicated at 120. At 112, if there are cache points in the neighborhood, then the irradiance gradients of the neighborhood cache points may be determined, for example by reading the values from the cache point records. Note that the irradiance gradient for a cache point may be calculated and stored in the cache point record when the cache point is added to the irradiance cache. The irradiance gradient at the query point may be determined if it has not already been calculated. The irradiance gradients of the neighborhood cache points are compared to the irradiance gradient at the query point. At 116, if the irradiance gradient of the query point is similar to or the same as the irradiance gradients of neighboring cache points, then no new cache point is added at this query point, as indicated at 118. At 116, if the irradiance gradients are different, then a new cache point corresponding to this query point may be added to the irradiance cache, as indicated at 120. In one embodiment, a specified threshold may be used in determining if two irradiance gradients are different; the two irradiance gradients are considered different if the difference between the gradient at the query point and a gradient at the neighbor cache point above a specified threshold. At 122, if there are more query points to be processed, then the method returns to 110. Otherwise, the method is done (i.e., the irradiance cache is complete).

Figure 8C:
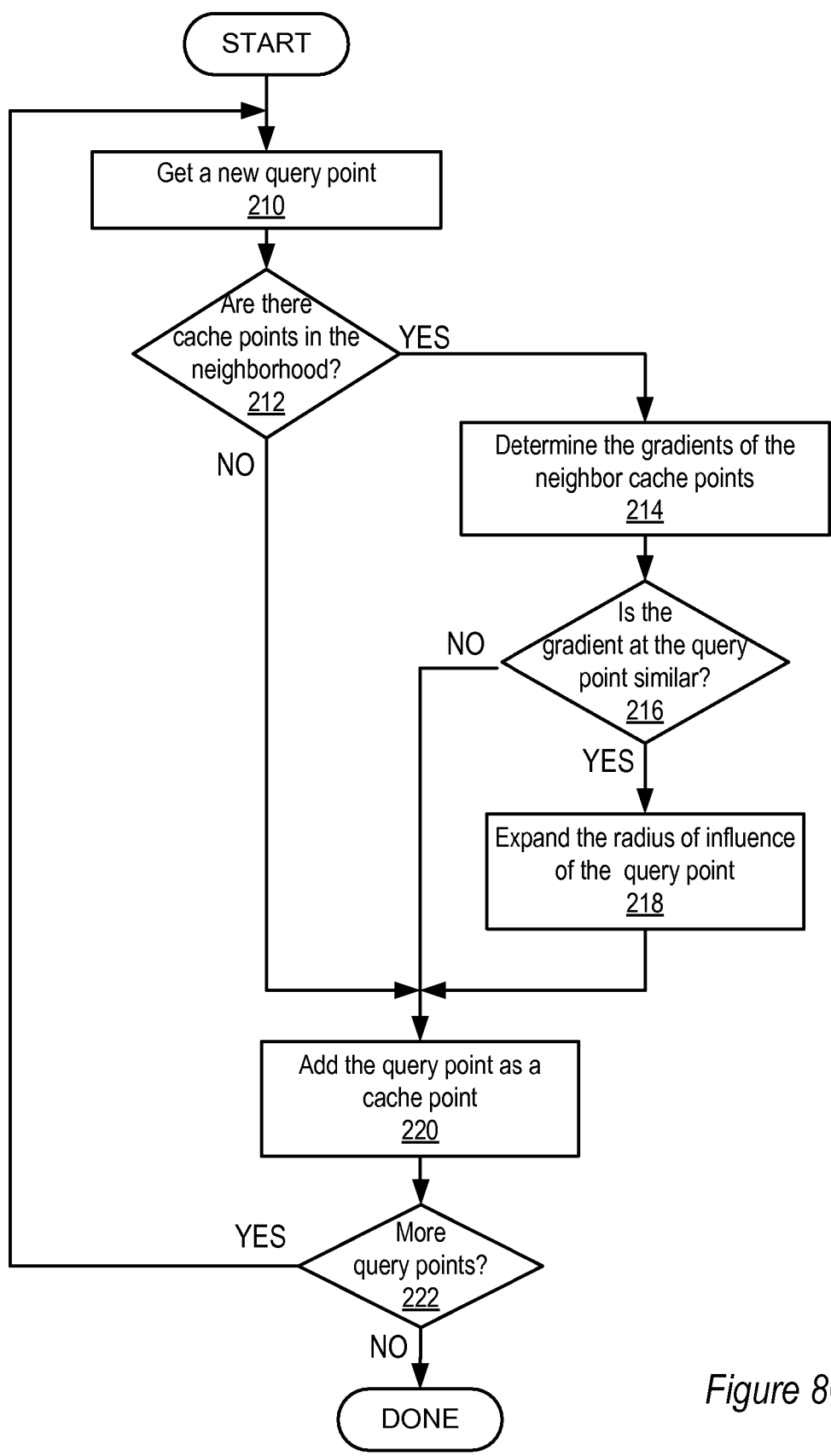
FIG. 8C is a more detailed flowchart of an irradiance caching method that reduces the number of cache points by determining cache points with appropriately anisotropic areas of influence according to another embodiment.

FIG. 8C is a more detailed flowchart of an irradiance caching method that reduces the number of cache points by determining cache points with appropriately anisotropic areas of influence according to another embodiment. As previously noted, when a query point is being examined, the gradient/hemisphere sampling may have already been computed for the point, so not adding the point to the cache would be wasteful. Therefore, in the embodiment illustrated in FIG. 8C, the radius that defines the region of influence for the query point is made larger in the direction of neighborhood cache points with the same or substantially similar irradiance gradients so that new cache points do not get added into those areas, but the query point under test is added as a cache point. This embodiment is consistent with a "lazy" approach of irradiance caching.

When building an irradiance cache, a new query point may be obtained, as indicated at 210. The irradiance gradient at the query point may be determined. A test may be performed to determine if there are cache points already in the cache that are within a specified neighborhood of the query point. At 212, if there are no cache points in the neighborhood, then a new cache point corresponding to this query point may be added to the irradiance cache, as indicated at 220. At 212, if there are cache points in the neighborhood, then the irradiance gradients of the neighborhood cache points may be determined, for example by reading the values from the cache point records. Note that the irradiance gradient for a cache point may be calculated and stored in the cache point record when the cache point is added to the irradiance cache. The irradiance gradient at the query point is determined if it has not already been calculated. The irradiance gradients of the neighborhood cache points are compared to the irradiance gradient at the query point. At 216, if the irradiance gradient of the query point is similar to or the same as the irradiance gradients of neighboring cache points, then the radius that defines the region of influence for the query point is made larger in the direction of neighborhood cache points with the same or substantially similar irradiance gradient so that new cache points do not get added into those areas, as indicated at 218, and a new cache point corresponding to this query point may be added to the irradiance cache, as indicated at 220. In one embodiment, a specified threshold may be used in determining if two irradiance gradients are different; the two irradiance gradients are considered different if the difference between the gradient at the query point and a gradient at the neighbor cache point above a specified threshold. At 216, if the irradiance gradients are different, then a new cache point corresponding to this query point may be added to the irradiance cache, as indicated at 220. At 222, if there are more query points to be processed, then the method returns to 210. Otherwise, the method is done (i.e., the irradiance cache is complete).

Various embodiments may implement method(s) similar to or as variations of those described in FIGS. 8A through 8C; the methods in these flowcharts are not intended to be limiting. Note that using the method(s) described in FIGS. 8A through 8C in an irradiance caching technique may result in some cache points that store information defining an elliptical region of influence, or appropriately anisotropic area of influence, around the cache point (the cache points for which the irradiance gradient at the point is similar to or the same as the irradiance gradients of neighboring cache points; for example, see point $cp_1$ in FIG. 7C), and other cache points that store information defining a more circular region of influence around the cache point. Method(s) such as those described in FIGS. 8A through 8C produce cache point distribution around the intersections of surfaces more similar to the distribution shown in FIG. 7C than to the distribution shown in FIG. 7A. FIGS. 9B, 10B, 11B and 12B show examples of cache point spacing resulting from implementations of embodiments of the irradiance caching methods as described herein that determine cache points with appropriately anisotropic areas of influence.

Note that one or more thresholds that may be used in computing neighborhoods and in comparing irradiance gradients may be specified, set as constants, or calculated relative to the image being processed. Thus, in one embodiment, a test to see whether two irradiance gradients are similar or different may consider the irradiance gradients similar if the difference between the values is at or below an irradiance gradient threshold, or different if the difference between the values is above the irradiance gradient threshold. Similarly, a test to see whether two points are within a neighborhood may consider the points within a neighborhood if the distance between the points is below a neighborhood distance threshold, and not within a neighborhood if the distance between the points is above the neighborhood distance threshold.

Figure 9A:
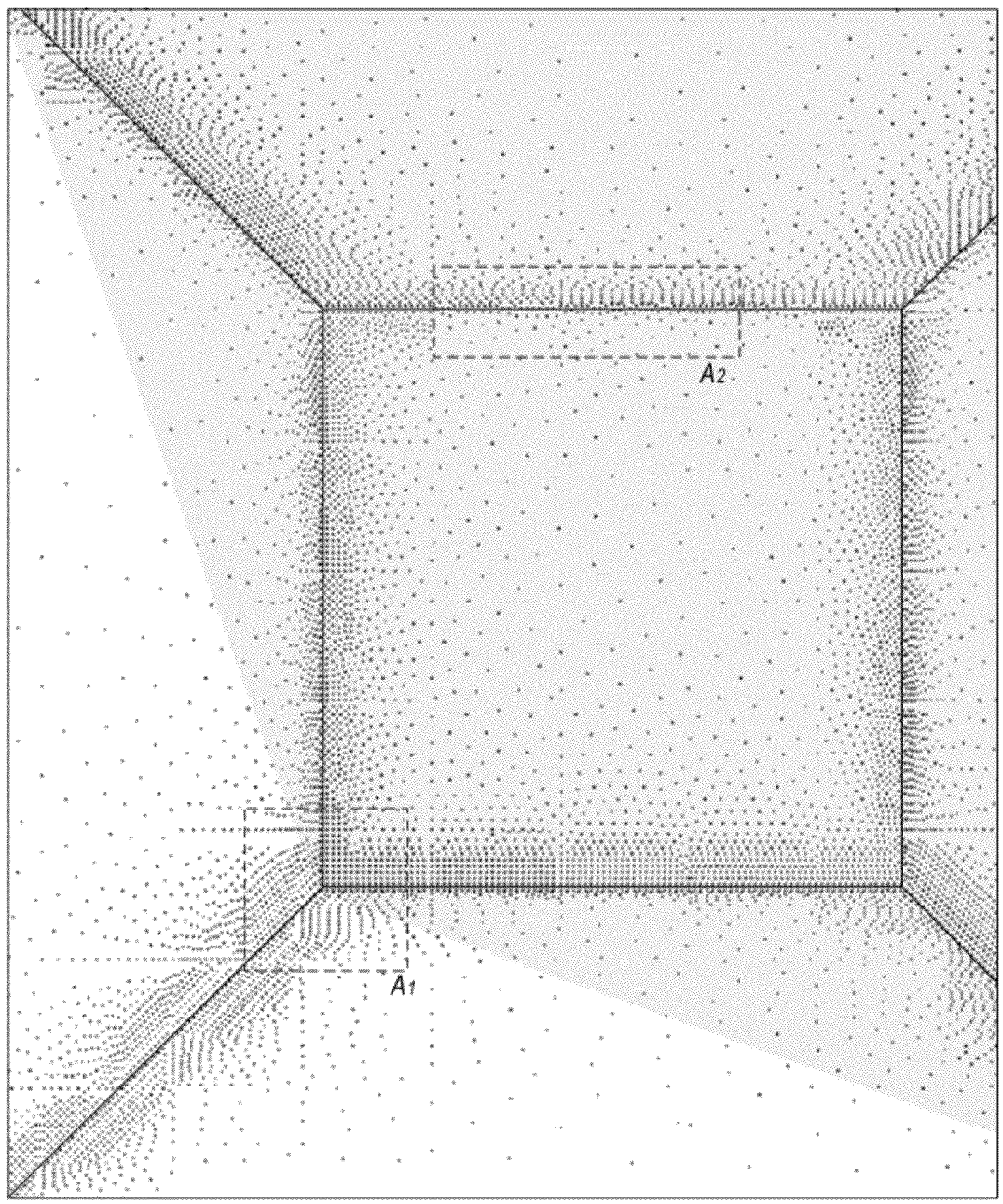
FIG. 9A shows a shaded Cornell box with examples of cache points according to a conventional irradiance caching method.
Figure 9B:
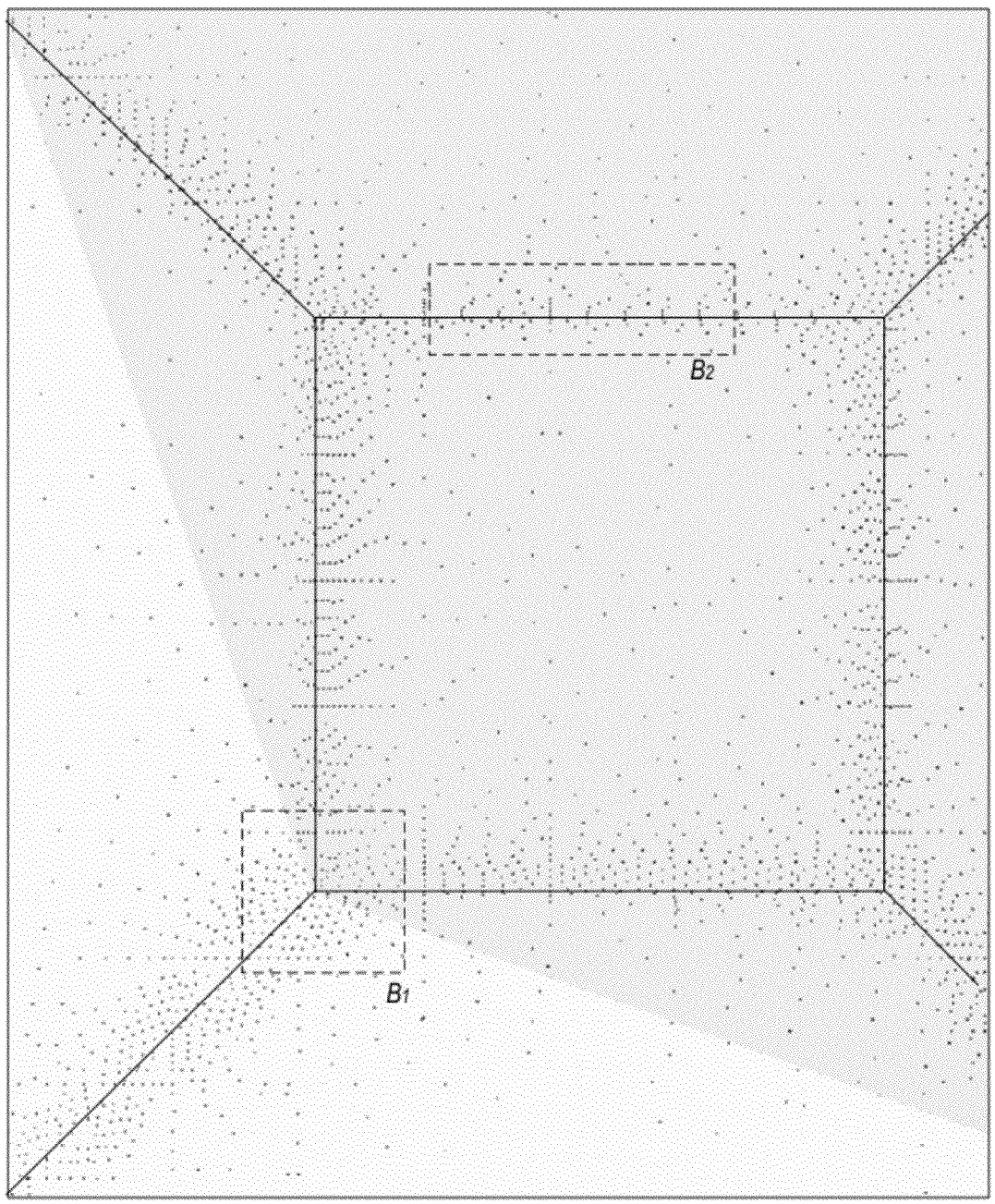
FIG. 9B shows the same shaded Cornell box as FIG. 9A with examples of cache points determined according to an embodiment of an irradiance caching method that determines cache points with appropriately anisotropic areas of influence.
Figure 10A:
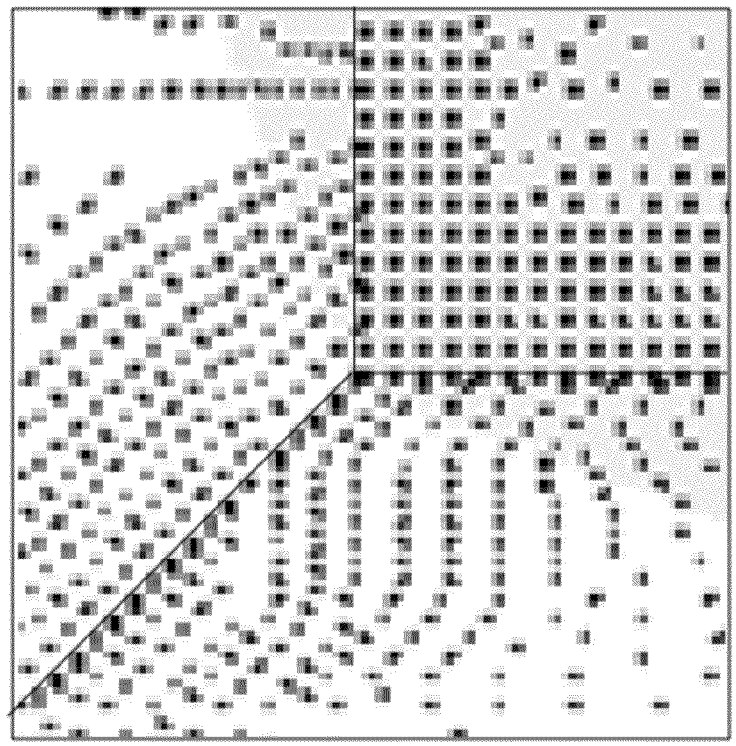
FIGS. 10A and 10B show zoom-ins of region A1 of FIG. 9A and region B1 of FIG. 9B, respectively.
Figure 10B:
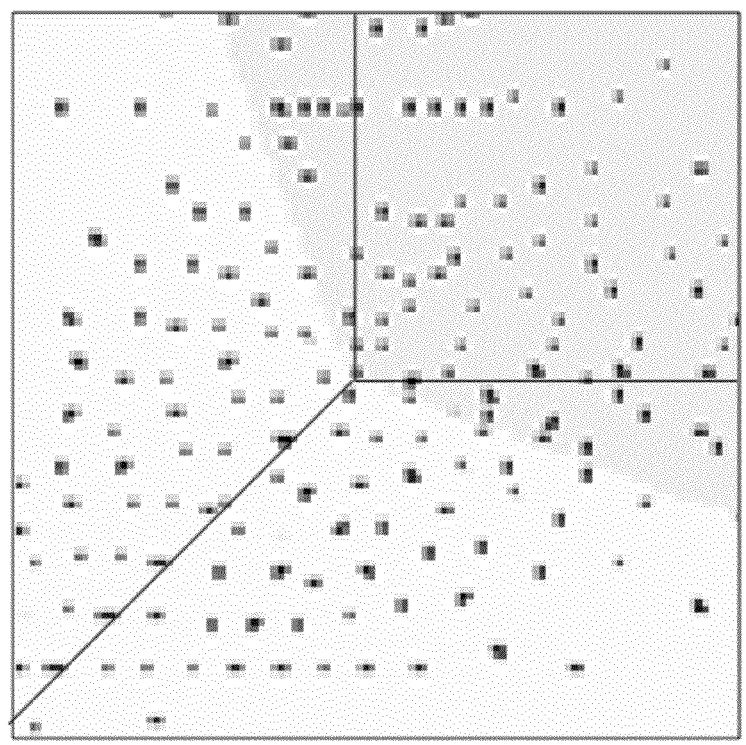
Figure 11A:
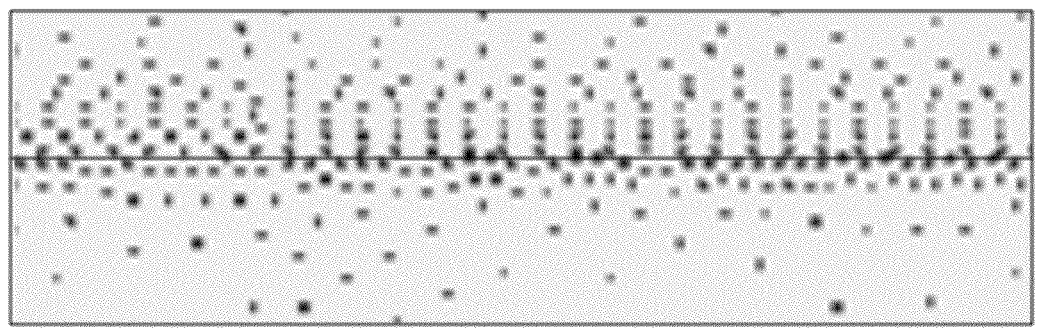
FIGS. 11A and 11B show zoom-ins of region A2 of FIG. 9A and region B2 of FIG. 9B, respectively.
Figure 11B:
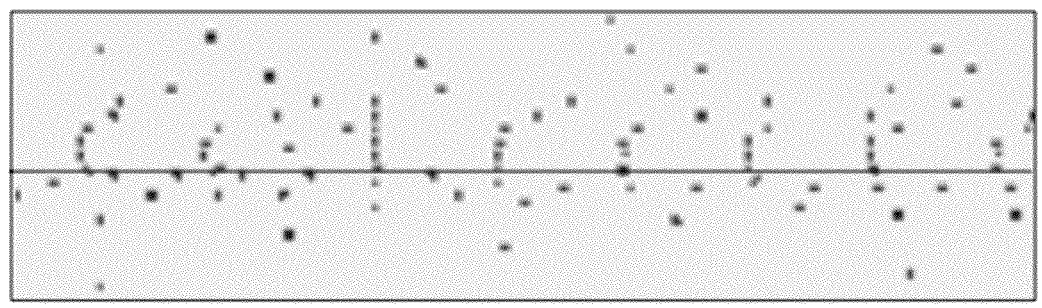

FIG. 9A shows a shaded Cornell box with examples of cache points according to a conventional irradiance caching method that determines cache points with isotropic areas of influence, even around the intersections of surfaces. FIG. 9B shows the same shaded Cornell box with examples of cache points determined according to an embodiment of the irradiance caching method as described herein that determines cache points with appropriately anisotropic areas of influence. In both Figures, the dots represent cache points. Again, note that there are fewer cache points, especially around intersections of surfaces, in FIG. 9B than in FIG. 9A. FIGS. 10A and 10B show zoom-ins of region $A_1$ of FIG. 9A and region $B_1$ of FIG. 9B, respectively. FIGS. 11A and 11B show zoom-ins of region $A_2$ of FIG. 9A and region $B_2$ of FIG. 9B, respectively.

Figure 12A:
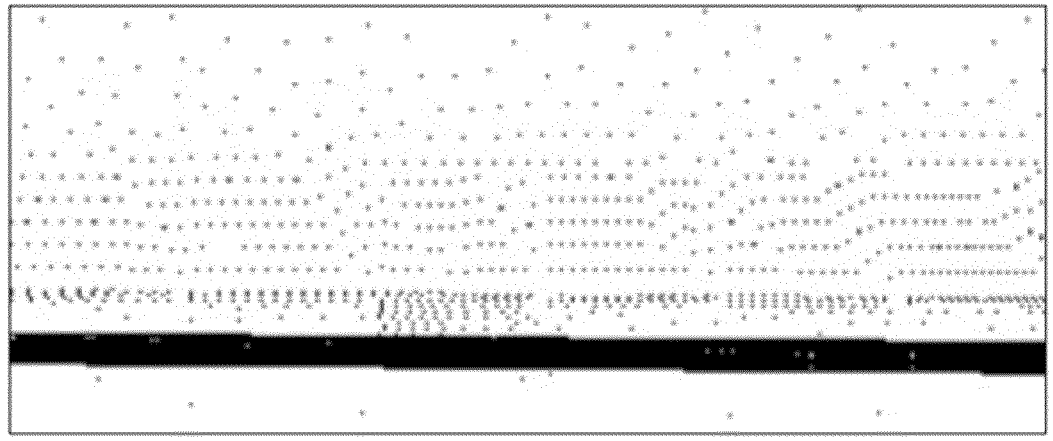
FIG. 12A shows examples of cache points according to a conventional irradiance caching method that determines cache points with isotropic areas of influence.
Figure 12B:
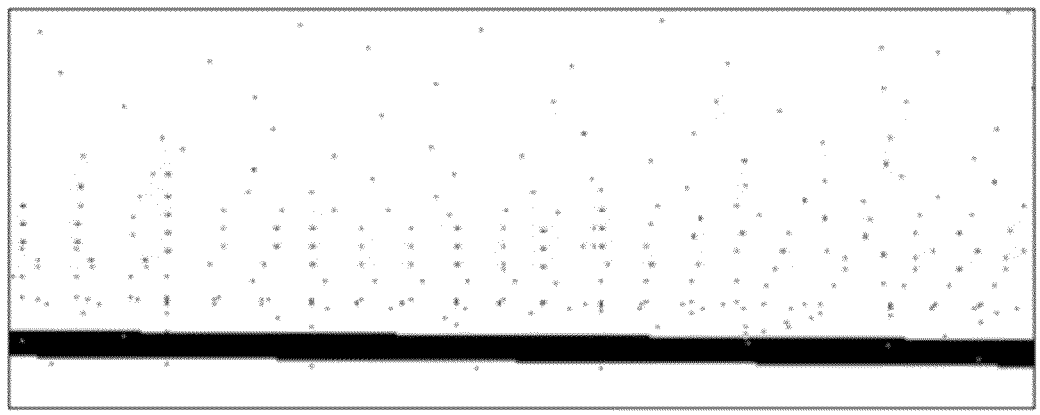
FIG. 12B shows the same scene as FIG. 12 with examples of cache points determined according to an embodiment of the irradiance caching method as described herein that determines cache points with appropriately anisotropic areas of influence.

FIGS. 12A and 12B show a single strip of light that is reflecting onto a nearby wall. Note that the colors of the image are inverted, so the "light" is actually the black strip. In both Figures, the dots represent cache points. FIG. 12A shows examples of cache points according to a conventional irradiance caching method that determines cache points with isotropic areas of influence, even around the intersections of surfaces. FIG. 12B shows the same scene with examples of cache points determined according to an embodiment of the irradiance caching method as described herein that determines cache points with appropriately anisotropic areas of influence. Again, note that there are fewer cache points in FIG. 12B than in FIG. 12A.

Indirect Lighting Module Implementation

Figure 13:
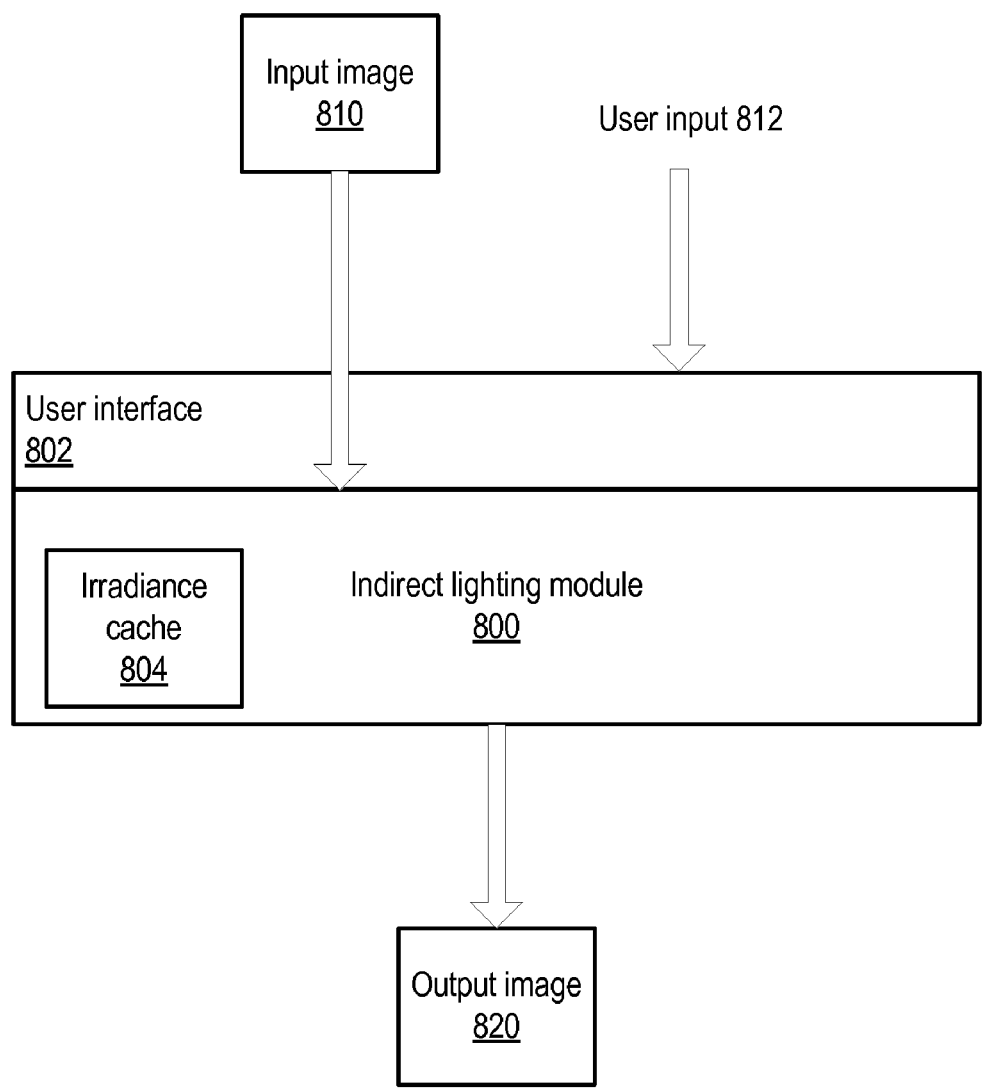
FIG. 13 illustrates an example of an indirect lighting module that may implement embodiments of the method for diffuse indirect lighting computation in a scene.

FIG. 13 illustrates an example of an indirect lighting module that may implement embodiments of the method for diffuse indirect lighting computation including embodiments of an irradiance caching method that reduces the number of cache points by determining cache points with appropriately anisotropic areas of influence as described above. Embodiments may be implemented as or in an indirect lighting module 800 as illustrated in FIG. 13. In one embodiment, module 800 may provide a user interface 802 that includes one or more user interface elements via which a user may initiate, interact with, direct, and/or control the method for diffuse indirect lighting computation as performed by module 800. Module 800 may obtain an image 810 or region of an image and, optionally, user input 812, and compute indirect lighting for the image accordingly as described herein to generate an output image 820 from the input image 810. Irradiance cache 804 may be used to store determined irradiance values and maximum form factors for surface points in the scene, and may be checked for nearby irradiance points when determining if the irradiance value for a current surface point being processed can be generated using interpolation and/or extrapolation, as described herein. A cosine weighted method in accordance with equations (1) and (2) may be used in determining if a cached irradiance point qualifies as a nearby irradiance point. In one embodiment, output image 820 may be a new image; in other words, input image 810 may be preserved unchanged by module 800. In one embodiment, input image 810 may be directly modified by module 800, and thus output image 820 may represent a modified input image 810.

Indirect lighting module 800 may be implemented as or in a stand-alone application or as a module of or plug-in for a graphics application or graphics library that may provide other graphical/digital image processing tools. Examples of types of applications in which embodiments of module 800 may be implemented may include, but are not limited to, scientific, medical, design (e.g., CAD systems), painting, publishing, digital photography, video editing, games, animation, and/or other applications in which digital image processing may be performed. Specific examples of applications in which embodiments may be implemented include, but are not limited to, Adobe® Photoshop®, Adobe® Illustrator®, and Adobe® After Effects®. In addition to generating output image 820, module 800 may be used to display, manipulate, modify, and/or store the output image, for example to a memory medium such as a storage device or storage medium.

Global Illumination Rendering Module Implementation

Figure 14:
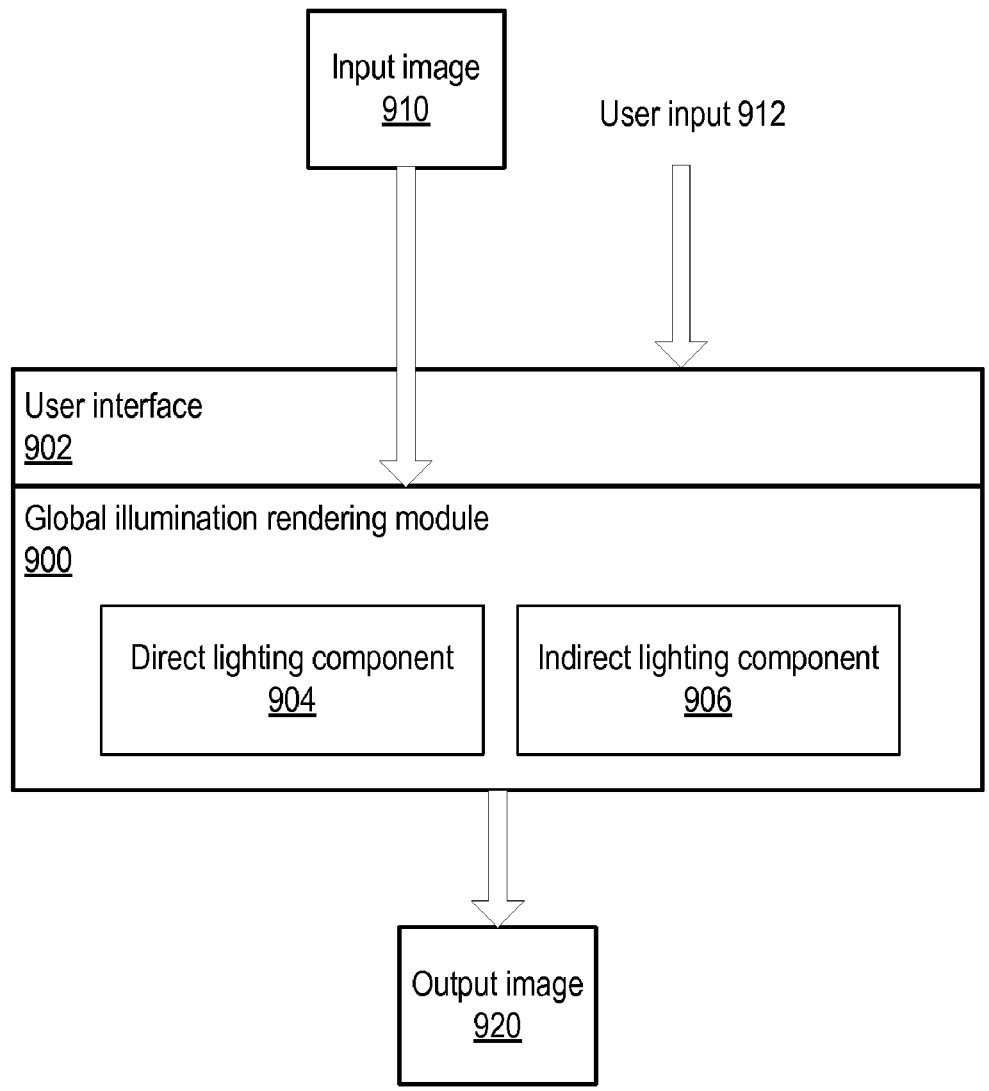
FIG. 14 illustrates an example of a global illumination rendering module that may implement embodiments of a method for computing direct lighting and a method for diffuse indirect lighting computation.

FIG. 14 illustrates an example of a global illumination rendering module that may implement a method for computing direct lighting and an embodiment of the method for diffuse indirect lighting computation described above, which may implement an irradiance caching method that reduces the number of cache points by determining cache points with appropriately anisotropic areas of influence, in a global illumination rendering module 900 as direct lighting component 904 and indirect lighting component 906, respectively. In one embodiment, module 900 may provide a user interface 902 that includes one or more user interface elements via which a user may initiate, interact with, direct, and/or control the direct lighting component 904 and/or the indirect lighting component 906. Module 900 may obtain an input image 910 or region of an image and, optionally, user input 912, and compute direct and/or indirect lighting for the image accordingly to generate an output image 920 from the input image 910. Both direct lighting and indirect lighting may be computed for an input image 910; alternatively, either one or the other may be computed. In one embodiment, direct lighting computation and indirect lighting computation may be performed in parallel. In other embodiments, direct lighting computation and indirect lighting computation may be performed serially; that is, one may be performed first, and then the other. In one embodiment, direct lighting computation may be performed first, and then indirect lighting computation. In another embodiment, indirect lighting computation may be performed first.

In one embodiment, output image 920 may be a new image; in other words, input image 910 may be preserved unchanged by module 900. In one embodiment, input image 910 may be directly modified by module 900, and thus output image 920 may represent a modified input image 910.

Global illumination rendering module 900 may be implemented as or in a stand-alone application or as a module of or plug-in for a graphics application or graphics library that may provide other graphical/digital image processing tools. Examples of types of applications in which embodiments of module 900 may be implemented may include, but are not limited to, scientific, medical, design (e.g., CAD systems), painting, publishing, digital photography, video editing, games, animation, and/or other applications in which digital image processing may be performed. Specific examples of applications in which embodiments may be implemented include, but are not limited to, Adobe® Photoshop®, Adobe® Illustrator®, and Adobe® After Effects®. In addition to generating output image 920, module 900 may be used to display, manipulate, modify, and/or store the output image, for example to a memory medium such as a storage device or storage medium.

Example System

Figure 15:
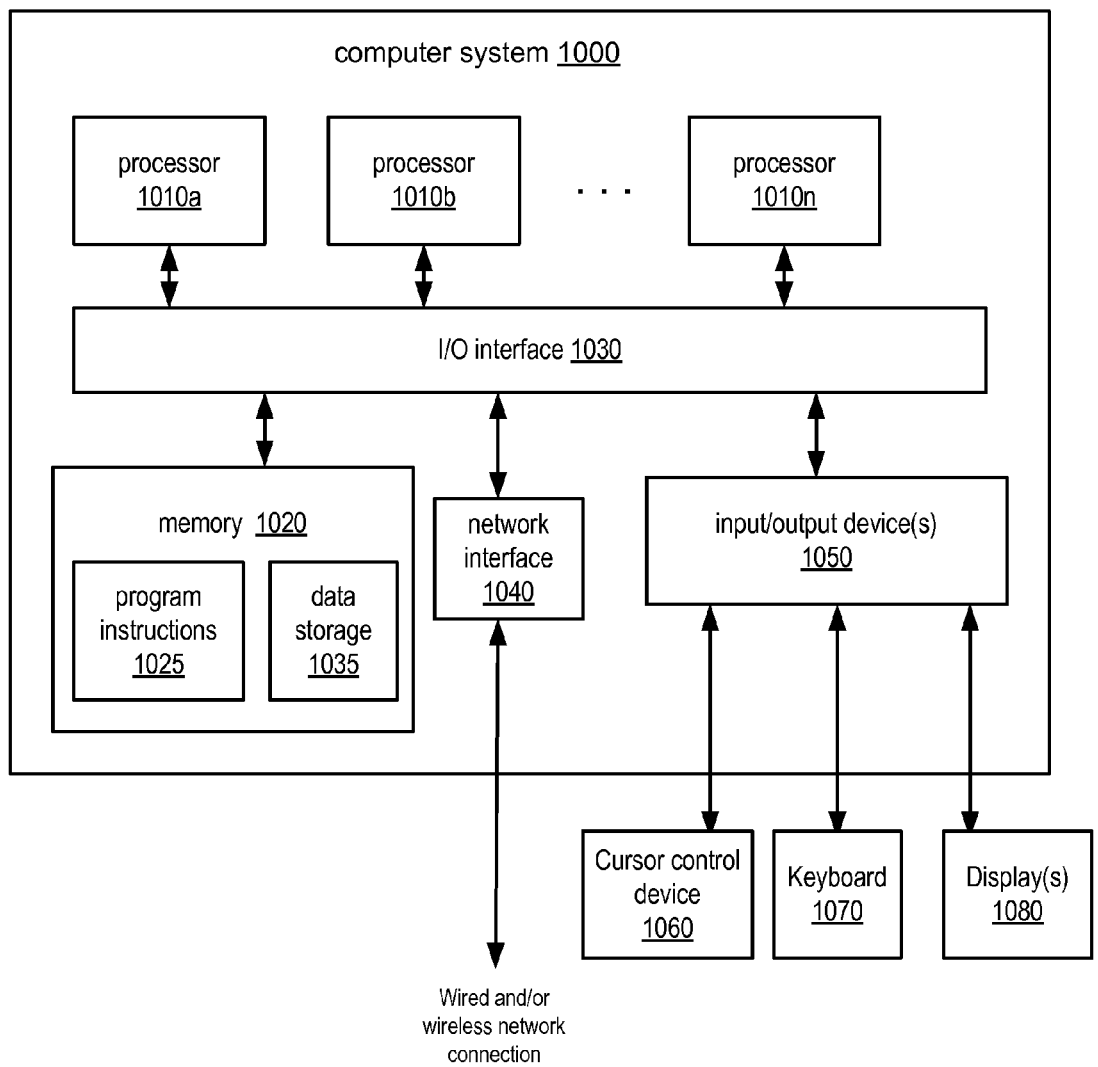
FIG. 15 illustrates an example of a computer system that may be used in embodiments.

Various components of embodiments of a method and apparatus for diffuse indirect lighting computation as described herein, for example an indirect lighting module 800, or a global illumination rendering module 900 that includes a direct lighting component 904 and indirect lighting component 906, may be executed on one or more computer systems, which may interact with various other devices. Note that indirect lighting module 800 may implement an irradiance caching method that reduces the number of cache points by determining cache points with appropriately anisotropic areas of influence, as described herein. One such computer system is illustrated by FIG. 15. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for diffuse indirect lighting computation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of a method and apparatus for diffuse indirect lighting computation, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 15, memory 1020 may include program instructions 1025, configured to implement embodiments of a method and apparatus for diffuse indirect lighting computation, and data storage 1035, comprising various data accessible by program instructions 1025. In one embodiment, program instructions 1025 may include software elements of embodiments of a method and apparatus for diffuse indirect lighting computation, as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a method and apparatus for diffuse indirect lighting computation as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method for generating an irradiance cache, comprising:
    performing, by one or more computing devices:
        determining an irradiance gradient at a query point of a scene to be rendered;
        determining cache points in the irradiance cache that are within a specified neighborhood of the query point as neighbor cache points to the query point;
        determining that the irradiance gradient at one or more of the neighbor cache points along a vector in a particular direction is the same as or substantially similar to the irradiance gradient at the query point;
        expanding a radius of a region of influence of the query point along vectors in the particular direction to thus define an elliptical region of influence at the query point in response to determining that the irradiance gradient at the one or more neighbor cache points along the vector in the particular direction is the same as or similar to the irradiance gradient at the query point; and adding a new cache point corresponding to the query point to the irradiance cache, wherein the new cache point indicates the elliptical region of influence.

2. The computer-implemented method as recited in claim 1, wherein the irradiance gradient at the query point is a vector in a direction in which lighting is changing most rapidly.

3. The computer-implemented method as recited in claim 1, wherein said determining cache points in the irradiance cache that are within a specified neighborhood of the query point as neighbor cache points to the query point comprises:

determining a distance between the query point and a cache point in the irradiance cache; and if the distance between the query point and the cache point is at or below a specified neighborhood distance threshold, determining the cache point as a neighbor cache point.

4. The computer-implemented method as recited in claim 1, wherein said determining that the irradiance gradient at one or more of the neighbor cache points along a vector in a particular direction is the same as or substantially similar to the irradiance gradient at the query point comprises determining that a difference between the irradiance gradient at the query point and the irradiance gradient at each of the one or more neighborhood cache points is at or below a specified irradiance gradient threshold.

5. The computer-implemented method as recited in claim 1, wherein said expanding a radius of a region of influence of the query point along vectors in the particular direction to thus define an elliptical region of influence at the query point causes cache points in the irradiance cache to be spaced farther apart along the vectors in the particular direction than along vectors in the direction of the irradiance gradient.

6. The computer-implemented method as recited in claim 1, wherein the vectors in the particular direction are substantially perpendicular to a vector in the direction of the irradiance gradient.

7. The computer-implemented method as recited in claim 1, wherein said determining cache points in the irradiance cache that are within a specified neighborhood of the query point as neighbor cache points to the query point comprises performing shadow testing to determine if the cache points are on the same surface as the query point, wherein only cache points in the irradiance cache that are on the same surface as the query point qualify as potential neighborhood cache points.

8. The computer-implemented method as recited in claim 1, wherein the irradiance cache stores an indirect irradiance value for each of a subset of surface points in the scene.

9. The computer-implemented method as recited in claim 8, wherein the indirect irradiance values are calculated in accordance with a ray tracing technique, wherein calculating an indirect irradiance value for a surface point in accordance with the ray tracing technique comprises casting rays outward over a hemisphere around the surface point to estimate a sum of incoming light to the surface point.

10. The computer-implemented method as recited in claim 8, further comprising rendering the scene in accordance with the stored indirect irradiance values.

11. A system, comprising:
at least one processor; and
a memory comprising program instructions, wherein the program instructions are executable by the at least one processor to:

determine an irradiance gradient at a query point of a scene to be rendered;

determine cache points in the irradiance cache that are within a specified neighborhood of the query point as neighbor cache points to the query point;

determine that the irradiance gradient at one or more of the neighbor cache points along a vector in a particular direction is the same as or substantially similar to the irradiance gradient at the query point;

expand a radius of a region of influence of the query point along vectors in the particular direction to thus define an elliptical region of influence at the query point in response to determining that the irradiance gradient at the one or more neighbor cache points along the vector in the particular direction is the same as or similar to the irradiance gradient at the query point; and add a new cache point corresponding to the query point to the irradiance cache, wherein the new cache point indicates the elliptical region of influence.

12. The system as recited in claim 11, wherein the irradiance gradient at the query point is a vector in a direction in which lighting is changing most rapidly.

13. The system as recited in claim 11, wherein, to determine cache points in the irradiance cache that are within a specified neighborhood of the query point as neighbor cache points to the query point, the program instructions are executable by the at least one processor to:

determine a distance between the query point and a cache point in the irradiance cache; and if the distance between the query point and the cache point is at or below a specified neighborhood distance threshold, determine the cache point as a neighbor cache point.

14. The system as recited in claim 11, wherein, to determine that the irradiance gradient at one or more of the neighbor cache points along a vector in a particular direction is the same as or substantially similar to the irradiance gradient at the query point, the program instructions are executable by the at least one processor to determine that a difference between the irradiance gradient at the query point and the irradiance gradient at each of the one or more neighborhood cache points is at or below a specified irradiance gradient threshold.

15. The system as recited in claim 11, wherein said expanding a radius of a region of influence of the query point along vectors in the particular direction to thus define an elliptical region of influence at the query point causes the program instructions to space cache points in the irradiance cache farther apart along the vectors in the particular direction than along vectors in the direction of the irradiance gradient.

16. The system as recited in claim 11, wherein the vectors in the particular direction are substantially perpendicular to a vector in the direction of the irradiance gradient.

17. The system as recited in claim 11, wherein, to determine cache points in the irradiance cache that are within a specified neighborhood of the query point as neighbor cache points to the query point, the program instructions are executable by the at least one processor to perform shadow testing to determine if the cache points are on the same surface as the query point, wherein only cache points in the irradiance cache that are on the same surface as the query point qualify as potential neighborhood cache points.

18. The system as recited in claim 11, wherein the irradiance cache stores an indirect irradiance value for each of a subset of surface points in the scene.

19. The system as recited in claim 18, wherein the program instructions are executable by the at least one processor to calculate the indirect irradiance values in accordance with a ray tracing technique, wherein, to calculate an indirect irradiance value for a surface point in accordance with the ray tracing technique, the program instructions are executable by the at least one processor to cast rays outward over a hemisphere around the surface point to estimate a sum of incoming light to the surface point.

20. The system as recited in claim 18, wherein the program instructions are executable by the at least one processor to render the scene in accordance with the stored indirect irradiance values.

21. A non-transitory computer-readable storage medium storing program instructions, wherein the program instructions are computer-executable to implement generating an irradiance cache, wherein, in said generating the irradiance cache, the program instructions are computer-executable to implement:
    determining an irradiance gradient at a query point of a scene to be rendered;
    determining cache points in the irradiance cache that are within a specified neighborhood of the query point as neighbor cache points to the query point;
    determining that the irradiance gradient at one or more of the neighbor cache points along a vector in a particular direction is the same as or substantially similar to the irradiance gradient at the query point;
    expanding a radius of a region of influence of the query point along vectors in the particular direction to thus define an elliptical region of influence at the query point in response to determining that the irradiance gradient at the one or more neighbor cache points along the vector in the particular direction is the same as or similar to the irradiance gradient at the query point; and
    adding a new cache point corresponding to the query point to the irradiance cache, wherein the new cache point indicates the elliptical region of influence.

22. The non-transitory computer-readable storage medium as recited in claim 21, wherein the irradiance gradient at the query point is a vector in a direction in which lighting is changing most rapidly.

23. The non-transitory computer-readable storage medium as recited in claim 21, wherein, in said determining cache points in the irradiance cache that are within a specified neighborhood of the query point as neighbor cache points to the query point, the program instructions are computer-executable to implement:
    determining a distance between the query point and a cache point in the irradiance cache; and
    if the distance between the query point and the cache point is at or below a specified neighborhood distance threshold, determining the cache point as a neighbor cache point.

24. The non-transitory computer-readable storage medium as recited in claim 21, wherein, in said determining that the irradiance gradient at one or more of the neighbor cache points along a vector in a particular direction is the same as or substantially similar to the irradiance gradient at the query point, the program instructions are computer-executable to implement determining that a difference between the irradiance gradient at the query point and the irradiance gradient at each of the one or more neighborhood cache points is at or below a specified irradiance gradient threshold.

25. The non-transitory computer-readable storage medium as recited in claim 21, wherein said expanding a radius of a region of influence of the query point along vectors in the particular direction to thus define an elliptical region of influence at the query point causes the program instructions to space cache points in the irradiance cache farther apart along the vectors in the particular direction than along vectors in the direction of the irradiance gradient.

26. The non-transitory computer-readable storage medium as recited in claim 21, wherein the vectors in the particular direction are substantially perpendicular to a vector in the direction of the irradiance gradient.

27. The non-transitory computer-readable storage medium as recited in claim 21, wherein, in said determining cache points in the irradiance cache that are within a specified neighborhood of the query point as neighbor cache points to the query point, the program instructions are computer-executable to implement performing shadow testing to determine if the cache points are on the same surface as the query point, wherein only cache points in the irradiance cache that are on the same surface as the query point qualify as potential neighborhood cache points.

28. The non-transitory computer-readable storage medium as recited in claim 21, wherein the irradiance cache stores an indirect irradiance value for each of a subset of surface points in the scene.

29. The non-transitory computer-readable storage medium as recited in claim 28, wherein the program instructions are computer-executable to implement calculating the indirect irradiance values in accordance with a ray tracing technique, wherein, in said calculating an indirect irradiance value for a surface point in accordance with the ray tracing technique, the program instructions are computer-executable to implement casting rays outward over a hemisphere around the surface point to estimate a sum of incoming light to the surface point.

30. The non-transitory computer-readable storage medium as recited in claim 28, wherein the program instructions are computer-executable to implement rendering the scene in accordance with the stored indirect irradiance values.

31. A computer-implemented method for generating an irradiance cache, comprising:
    executing instructions on a specific apparatus so that binary digital electronic signals representing a scene to be rendered are analyzed to determine a query point;
    executing instructions on said specific apparatus so that binary digital electronic signals representing the query point are analyzed to determine an irradiance gradient at the query point;
    executing instructions on said specific apparatus so that binary digital electronic signals representing the irradiance cache are analyzed to determine cache points in the irradiance cache that are within a specified neighborhood of the query point as neighbor cache points to the query point;
    executing instructions on said specific apparatus so that binary digital electronic signals representing the neighbor cache points and the query point are analyzed to determine that the irradiance gradient at one or more of the neighbor cache points along a vector in a particular direction is the same as or substantially similar to the irradiance gradient at the query point;
    executing instructions on said specific apparatus so that binary digital electronic signals representing a radius of a region of influence of the query point is expanded along vectors in the particular direction to thus define an elliptical region of influence at the query point in response to determining that the irradiance gradient at the one or more neighbor cache points along the vector in the particular direction is the same as or similar to the irradiance gradient at the query point;

executing instructions on said specific apparatus so that binary digital electronic signals representing the irradiance cache is modified to include a new cache point corresponding to the query point, wherein the new cache point indicates the elliptical region of influence; and storing the modified irradiance cache in a memory location of said specific apparatus for later use.

* * * * *